(12) United States Patent
Rune

(10) Patent No.: US 8,155,029 B2
(45) Date of Patent: Apr. 10, 2012

(54) METHOD AND ARRANGEMENT FOR ASSURING PREFIX CONSISTENCY AMONG MULTIPLE MOBILE ROUTERS

(75) Inventor: Johan Rune, Lidingo (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 480 days.

(21) Appl. No.: 12/305,757

(22) PCT Filed: Jun. 20, 2006

(86) PCT No.: PCT/SE2006/050210
§ 371 (c)(1),
(2), (4) Date: Dec. 19, 2008

(87) PCT Pub. No.: WO2007/149024
PCT Pub. Date: Dec. 27, 2007

(65) Prior Publication Data
US 2010/0238811 A1    Sep. 23, 2010

(51) Int. Cl.
*H04L 12/28* (2006.01)
(52) U.S. Cl. .......................... 370/254; 370/400; 370/401
(58) Field of Classification Search .................. 370/254, 370/400, 401
See application file for complete search history.

(56) References Cited

U.S. PATENT DOCUMENTS

| | | | |
|---|---|---|---|
| 5,369,705 A | * | 11/1994 | Bird et al. ..................... 713/163 |
| 2006/0120315 A1 | * | 6/2006 | Olivereau et al. ............. 370/313 |
| 2006/0274695 A1 | * | 12/2006 | Krishnamurthi et al. ..... 370/331 |

OTHER PUBLICATIONS

Kumazawa, M et al: "Token based Duplicate Network Detection for split mobile network (Token based DND)", draft-kumazawa-nemo-tbdnd-02.txt, NEMO Working Group, Internet-Draft, Jul. 11, 2005.

* cited by examiner

*Primary Examiner* — Jason Mattis

(57) ABSTRACT

The present invention relates to a method and an arrangement in communication systems utilizing network mobility (NEMO). In moving networks comprising a plurality of mobile routers, MRs, it needs to be assured that two or more MRs sharing the same prefix, belong to the same moving network. The method according to the invention utilizes a local connectivity test to determine if a MR should be allowed a certain prefix. Unique shared secrets are agreed between the MRs and the home agent, HA. The MRs derive, based on their respective shared secrets, MR specific information, which are distributed among MRs in the moving network. A MR requesting a prefix from the HA, forwards the MR specific information to the HA. By comparing data generated using its stored shared secrets with data from the MR specific information, the HA can determine whether the MR requesting a certain prefix belongs to the same moving network as MRs already using that prefix.

16 Claims, 8 Drawing Sheets

METHOD AND ARRANGEMENT FOR ASSURING PREFIX CONSISTENCY AMONG MULTIPLE MOBILE ROUTERS

TECHNICAL FIELD

The present invention relates to a method and an arrangement in communication systems utilising network mobility. In particular, the present invention relates to moving networks comprising a plurality of mobile routers.

BACKGROUND

The requirement to cater for mobility in packet data communication systems, for example IP-systems (Internet Protocol systems), is widely recognized and the research and development activities in the area are extensive. Different aspects of mobility, which a packet data communication system preferably may manage, may be envisaged. A first example relates to a mobile communication node moving and therefore need to change its access point to the fixed network from a first access point of a first Wireless Local Area Network (WLAN) to a second access point of a second WLAN. A second example of mobility involves not just a moving communication node, but also a whole network which is moving. The mobile communication node may be fixed relative the moving network, or alternatively, is in relative motion also with regards to the moving network. An examples of a moving network is a local network within a transport vehicle (e.g. bus, train or aircrafts), which will include a mobile router or mobile routers through which all communication nodes in the moving network can communicate. The moving network will typically comprise communication nodes, including user equipment (UE) with communication abilities, such as laptops, mobile phones, PDAs (Personal Digital Assistants), game pads etc. Also equipment not associated to a human user such as vending machines, ATMs, the transport vehicle itself and other types of machinery may be provided with communication means and part of the moving network. The communication nodes communicate via wireless or wireline means with a router (or more) within the transport vehicle, such that all communication destined to an external address will pass via the router. A moving network may also be e.g. a Personal Area Network (PAN), wherein a PAN comprises all communication devices associated with a user and situated within short range radio communication distance form each other.

Various aspects of mobility in IP-based communication systems are regulated in the Mobile IPv6 (MIPv6) protocol. Moving networks is in IPv6 referred to as NEtwork MObility (NEMO) and described in "The Network Mobility (NEMO) Basic Support Protocol", by Devarapalli et al, RFC 3963, January 2005. The protocol is an extension of Mobile IPv6 and allows session continuity for every communication node (or communication device) in the moving network as the network moves. It allows a mobile router (MR) to maintain a stable network prefix for a moving network, the Mobile Network Prefix, MNP, even as the mobile router changes its, and thus the moving network's, point of attachment to a fixed network infrastructure. The Mobile Network Prefix will in the following be refereed to as the prefix.

The prefix stability is achieved by making a Home Agent (HA) a fixed point of presence, for the MR and maintaining connectivity between the HA and the MR through a bi-directional tunnel, which is similar to the handling of a moving communication node according to Mobile IPv6. The prefix is allocated from an address range of the home network, i.e. the subnet to which the HA is attached, and can thus remain the same even as the MR and its network moves. When the MR attaches to a network in a new location, it acquires a new care-of address, but the MRs home address and prefix are unchanged. However, in similarity with MIPv6 the MR has to register its new care-of address in the HA in order to maintain the MR-HA tunnel as described in D. Johnson et al., "Mobility Support in IPv6", RFC 3775, June 2004.

The communication nodes belonging to the moving network that moves along with the mobile router (or routers) are called Mobile Network Nodes (MNNs). According to the NEMO basic support protocol their configuration will not be changed as the MR changes its point of attachment. In other words, the mobility is transparent to them.

The prior art NEMO basic support protocol allows only a single care-of address to be registered in the HA for a certain MR at any one time. Multiple simultaneous care-of addresses are not allowed and thus multiple simultaneous accesses and MR-HA tunnels are not possible for a MR.

Furthermore, the NEMO basic support protocol assumes that the MR is preconfigured with the prefix that is allocated to the MR out of the address range of the home network (or other prefix range supported by the HA).

As an option in the NEMO basic support protocol, the MR and the HA uses a regular routing protocol on its mutual "link", i.e. in between each other in the MR-HA tunnel. With this option the HA is not provided with the ability to handle announcement of prefixes that are being used by "active" MRs (i.e. MRs that have valid bindings in the HA). This is instead handled automatically by the routing protocol in the regular manner.

Multiple MRs may be advantageous in that they provide several external accesses to the moving network, possibly using several different access technologies. There are several reasons motivating why support for simultaneous usage of several accesses is beneficial in this scenario, including e.g. robustness, increased aggregated bandwidth and different application/user requirements/preferences. In order to provide an efficient and correct synchronization of source address selection and router selection, the MRs belonging to the same moving network, and sharing the same HA, should preferably be assigned the same prefix. Although Mobile IPv6 and the NEMO basic support protocol do not prevent MRs sharing the same prefix, there is no explicitly support for this either. This lack of support may give rise to an uncontrolled prefix-situation with potential problems of inconsistent routing tables and malfunctioning routing.

The Internet-Draft "Neighbor MR Authentication and Registration Mechanism in Multihomed Mobile Networks" [http://ietfreport.isoc.org/all-ids/draft-cho-nemo-mr-registration-00.txt] 2004, describes a method wherein a MR identifies neighboring MRs in the same moving network, that can be used to provide alternative paths for fault recovery and/or load sharing. According to the described method, router advertisements are extended with addressing information, the home address (HoA) and care-of address (CoA), of the sending MR. A MR gathers information about its neighboring MRs by listening to router advertisements and collecting the addressing information associated with each identified neighbor MR. The retrieved addressing information is "authenticated" through the return routability test according to Mobile IPv6. However, since the basis for the "authentication" is information originating from the neighboring MR itself, the security will be low. The system will for example be vulnerable to attacks. An attacker could first find out CoA and HoA of another MR (which may be located anywhere) and then announce these parameters in a false router advertisement.

Listening MRs would not be able to detect that the information is false, since the return routability test would succeed. Thus, the neighbor MRs as well as their respective HAs would be fooled by the attacker.

The Internet-Draft "Token based Duplicate Network Detection for split mobile network (Token based DND)" by M. Kumazawa et al., [http://ietfreport.isoc.org/all-ids/draft-kumazawa-nemo-tbdnd-02.txt], 2005, describes a solution that has as one of its purposes to allow the HA to verify that a MR requesting to be assigned a certain prefix that is already being used by (and "owned" by) another MR is connected to the same moving network as the other MR (i.e. the prefix "owner").

The solution is based on a token that is associated with a prefix. The MR that "owns" the prefix generates the token and sends it to the HA in the Binding Update message (BU) and then includes it in its Router Advertisements. If another MR subsequently sends a BU with the same prefix in the Mobile Network Prefix option it has to include the token associated with the prefix (assumedly received in a Router Advertisement from the "owner" of the prefix). The HA compares the prefix and token with the ones it has previously stored and if they match, the MR is accepted as a "borrower" of the prefix. If the MR fails to supply this token or supplies another token, the HA will not accept the MR as a "borrower" of the prefix.

A serious drawback of this solution is that that no protection is offered against a malicious MNN or MR that hi-jacks the token and pretends to be the owner of the prefix.

Further drawbacks originate from the facts that the solution distinguishes between "owners" and "borrowers" of a prefix and that the token is associated with a prefix, not an MR. This asymmetry makes the solution inflexible. For instance, a MR cannot use a certain prefix unless its (preconfigured) "owner" is already actively using it and if the "owner" of the prefix is disconnected, and its binding in the HA times out, then any other MRs using the prefix have to abandon it. A further problem is that the mechanism only verifies that the "owner" of a certain prefix is connected to the same moving network, but disregards existing "borrowers" of the prefix. Furthermore, the mechanism has poor temporal properties as the token update period, is the same as, or greater than, the Binding Update period, which further contribute to the severe security issues of the token-solution.

SUMMARY

Obviously an improved method and arrangement for assuring prefix consistency among multiple routers is needed.

The object of the present invention is to provide a method, system and programs that overcomes the drawbacks of the prior art techniques.

The method according to the invention utilises a local connectivity test to determine if a MR should be allowed to use a certain prefix.

In a scenario wherein the method of the invention is applicable, a first mobile router and at least a second mobile router are assigned to a home agent. The first mobile router belongs to a moving network and is assigned a first prefix. The method according to the invention utilises a local connectivity test to determine if the second mobile router belongs to the same moving network as the first mobile router. The first mobile router derive MR specific information which is shared with the other mobile routers in the moving network. The MR specific information should be included in messages confined to the moving network, i.e. link-local messages. The second mobile router, for example in a process requesting to be assigned, or re-assigned, a prefix from the home agent, forwards the MR specific information to the home agent. By comparing previously stored data relating to the first mobile router with the MR specific information, the home agent can determine whether the second mobile router belongs to the same moving network as the first mobile router already using the prefix. If so, the home agent can allow the second mobile router to use the requested prefix. Alternatively a home agent may initiate a local connectivity test according to the above, without a prior request from a mobile router of a prefix assignment, for the purpose of checking the prefix consistency of the mobile routers in a moving network.

The home agent may further determine if the age of the MR specific information is within a pre-determined time limit.

The MR specific information that is derived by the mobile routers in the network is preferably at least partly based on unique shared secrets, which previously have been established between the home agent and each mobile router. The shared secrets are stored by the home agent as part of the data relating to each mobile router, and respective shared secret is retrieved for the comparison with the MR specific information.

In one embodiment of the method according to the present invention a plurality of mobile routers belong to the same moving network and a first subset of the plurality of mobile routers are assigned the same first prefix. The embodiment comprises the steps of:

establishing unique shared secrets between the home agent and each of the mobile routers;

each of the first subset of mobile routers deriving respective MR specific information;

the mobile routers in the first subset of mobile routers sharing their respective MR specific information with the second mobile router;

the second mobile router forwarding MR specific information from at least the first subset of mobile routers to the home agent; and the home agent comparing the received MR specific information with respective stored data relating to each mobile router. The home agent allows the second mobile router to be assigned the first prefix only if local connectivity is indicated between the second mobile router and all mobile routers of the first subset of mobile routers, and only if the age of all MR specific information is within a pre-determined time limit.

A second embodiment of the invention comprises the steps of:

the home agent providing the second mobile router with unique one-time data; and the second mobile router forwarding the unique one-time data to the first mobile router (125) in a link-local message. The first mobile router creates MR specific information based at least on the previously shared secret, which was established between the first mobile router and the home agent, and the unique one-time data received from the second mobile router.

Preferably the first mobile router derives the MR specific information by performing an irreversible operation on the shared secret. In a corresponding way the home agent performs an irreversible operation on the same shared secret stored at the home agent and the unique one-time data and compares the result of the corresponding irreversible operation with the received MR specific information.

According to a third embodiment of the invention the first mobile router provides the MR specific information with an age indicator, from which the home agent can determine the age of the MR specific information.

The mobile router according to the invention provides gateway services in a moving network and comprises external communication means for providing communication with a home agent and local communication means for providing communication with other mobile routers in the moving network. The mobile router comprises a processor in connection with the external communication means, the local communication means and a memory module. The processor is adapted to, via the external communication means establish a shared secret with a home agent and to store the shared secret in a memory module. A module in the processor is adapted for generating MR specific information based at least on a shared secret retrieved from the memory module, and a message handling module is adapted for including the MR specific information in link-local messages, and distributing said messages via the local communication means. The processor may further comprise an age indicator module, adapted to provide the MR specific information with an age indicator.

The processor may further be adapted to receive unique one-time data, via the local communication means. The unique one-time data is used by the MR specific information generating module in the generation of MR specific information. Preferably, the MR specific information generating module is adapted to perform an irreversible operation on an unique one-time data and a shared secret.

The home agent according to the invention is adapted for administering prefixes for a plurality of mobile routers in a moving network, among with other tasks associated with a home agent. The home agent comprises communication means for providing communication with the plurality of mobile routers. According to the present invention the mobile router comprises means for establishing shared secrets with at least a first mobile router, means to store the shared secret(s) of respective mobile routers, and means for receiving MR specific information from a second mobile router via the communication means. The home agent is adapted for, and comprises means for, comparing received MR specific information associated with a first mobile router, but received from a second mobile router, with data generated using the stored shared secret of the second mobile router. The home agent may further be provided with means for extracting age information from MR specific information and to check if the age of MR specific information is within a predetermined time limit.

Thanks to the invention prefix consistency can be assured among multiple mobile routers in a moving network and multiple mobile routers may share the same prefix. The invention allows/enables the home agent to ensure that a shared prefix is assigned only to mobile routers connected to the same link ((i.e. to the same moving network). The invention thereby prevents that routing inconsistencies arise due to inconsistent prefix assignment. Thanks to the invention also the temporal properties of the shared prefixes can be addressed.

One advantage afforded by the invention relates to security, especially fraud prevention. Basing the MR specific information on the unique shared secret assures that a malicious node cannot produce false MR specific information, allegedly pertaining to another MR, and have this false MR specific information accepted by the HA. Furthermore, the age indicator, or alternatively the unique one-time data, makes replaying of MR specific information useless Another advantage with the present invention is that it can be implemented without significant delay to the BU process.

A further advantage is that the invention can be made to work with the current NEMO basic support protocol (i.e. without changes to the existing messages) Alternatively, an upgraded, but backwards compatible, protocol is introduced.

A still further advantage is that embodiments of the invention can be made to work in moving networks where the layer 1/layer 2 media do not allow all MRs to hear each other directly.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein FIG. 1 schematically illustrates a vehicle area network (VAN) wherein the method and arrangement according to the invention may be employed.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The method and arrangement according to the present invention will be described with references to Vehicle Area Network (VAN) and Personal Area Network (PAN), which should be seen as non-limiting examples of moving networks.

Figure 1:
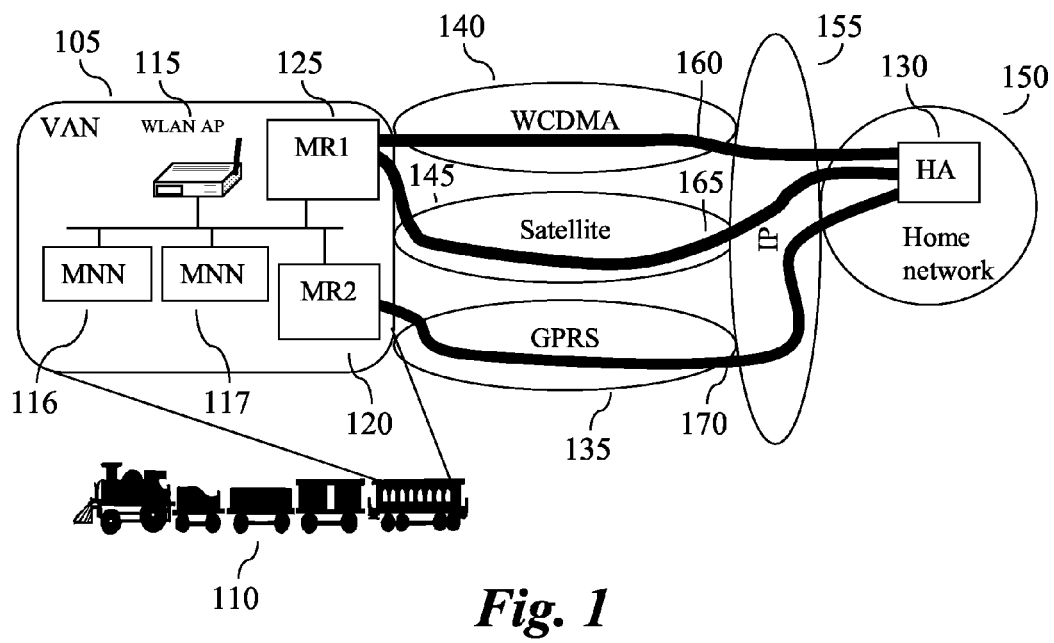

Illustrated in FIG. 1 is a VAN which consists of an internal network 105 within a public transportation vehicle 110 (e.g. bus, train, airplane). The internal network within the vehicle is for example a switched Ethernet with both Ethernet ports and WLAN access points 115 deployed. The internal network 105 has multiple Mobile Routers (MRs), MR2 120 and MR1 125, which act as gateways for external communication for all nodes, the MNNs 116, 117, inside the vehicle. The MRs are typically dedicated routing equipment, but may also offer other services to the MNN. The MRs are also responsible for mobility management for the entire network, i.e. mobility management is totally transparent to the nodes entering the vehicle. This means that there are no new requirements on the client nodes (a.k.a. the MNNs). The MRs share the same home agent, HA, 130 in the home network 150 and the same prefix from the address range of the home network. This facilitates their shared responsibility for the mobility management of the moving network. For instance, using one and the same HA 130 simplifies administration and sharing the same prefix avoids the problem of synchronizing source address selection and router selection. Given these advantages of sharing the same prefix in the same moving network, it must be assured that a prefix does not occur in more than one moving network in a system. If the same prefix were to be used in different moving networks inconsistent routing tables and severe routing problems would occur.

A reason for having multiple MRs may be to provide several external accesses to the VAN, possibly using several different access technologies. In this scenario example there are two MRs in the VAN, providing external access via the three different access technologies GPRS 135, WCDMA 140, and satellite 145. Several of these accesses can be available at the same time depending on for instance coverage and operator policies. There are several reasons motivating why support for simultaneous usage of several accesses is beneficial in this scenario, including e.g. robustness, increased aggregated bandwidth and different application/user requirements/preferences.

FIG. 1 illustrates the home network 150 comprising the home agent 130 that the MRs 120, 125 are communicating with. The communication is typically via an IP network 155. The MRs will need to setup one tunnel to the home agent for each available external access. The example in the figure shows three tunnels, indicated with thick solid lines, from the MRs 120, 125 to the home agent 130, two from the MR1, tunnels 160 and 165 via WCDMA and satellite accesses, respectively, and one tunnel 170 from MR2 via GPRS access.

Figure 2:
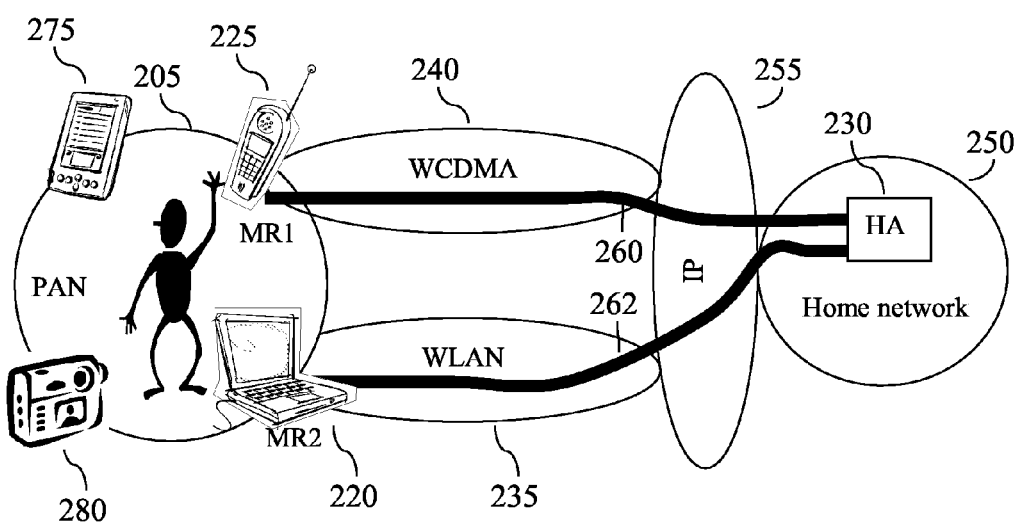
FIG. 2 schematically illustrates a personal area network (PAN) wherein the method and arrangement according to the invention may be employed.

A Personal Area Network (PAN) 205 with multiple mobile routers (MRs) is illustrated in FIG. 2. The MRs 220, 225, that provide the external access to the PAN 205, may for example be a mobile phone communicating with WCDMA 240 or a laptop PC communicating with WLAN 235. These accesses may be available at the same time. The benefits of having multiple MRs and multiple external accesses are more or less the same as in the VAN with multiple MRs scenario. The PAN can for instance be the gadgets/devices that the user is carrying with him/her for example a PDA 275 and a digital camera 280, or the network within the user's personal car.

The PAN 205 typically consists of a switched Ethernet network based on for instance Bluetooth™ running the PAN profile. The MRs act as routers within the PAN as well as for external network access. The MRs are also responsible for mobility management of the moving network, i.e. the PAN 205. As in the VAN with multiple MRs scenario, the MRs in the PAN share the same HA 230 and the same prefix from the address range of their home network.

The MRs are communicating with the home agent 230 deployed in the home network 250, typically via an IP network 255. The MRs need to setup a tunnel to the home agent for each available external access. The example in FIG. 2 shows two tunnels from the PAN to the home agent, via WCDMA 260 and WLAN 262 accesses.

The NEMO basic support protocol has as described in the background section no specific support for multiple MRs or multiple mobile router-home agent tunnels. To support the scenarios outlined in FIGS. 1 and 2 the method and arrangement according to the present invention extends the scope and mechanisms to encompass and support multiple MRs. The MRs of a moving network are assumed to share the same HA, in order to simplify administration, and the same prefix, in order to avoid the problem of synchronizing source address selection and router selection.

Although the NEMO basic support protocol does not prevent two MRs from having the same prefix, there is no explicit support for this either. Therefore, in view of the problems associated with such scenarios, using the NEMO basic support protocol for MRs sharing the same prefix may result in serious malfunctioning.

When multiple MRs share the same prefix, it must be ensured that the MRs are actually attached to the same moving network. Otherwise inconsistent routing tables and malfunctioning routing in the HA will occur. As a concrete example, a packet destined for MNN X, connected to moving network a via MR A, may instead be routed to moving network 13 via MR B, because MR A and MR B share the same prefix on which the routing is based.

A reasonable level of security should be integrated in the procedure—it should for instance not be possible (at least not without a great effort) for a malicious node to make the same prefix be assigned to MRs that are not connected to the same moving network. Note, however, that each MR is assumed to have a trust relation with its HA and secure communication with its HA. Secure procedures, e.g. IPsec, is provided for in MIPv6 and thus for the NEMO basic support protocol.

Moreover, it is preferable that the mechanism providing this feature requires as little additional configuration as possible, in the involved nodes i.e. MRs and HAs.

In addition to the above, the invention provides mechanisms to extend the NEMO Basic Support protocol to support dynamic assignment of prefixes to MRs, instead of relying solely on prefixes that are preconfigured in the MRs.

Assume a scenario with at least two MRs, MR2 and MR1, and their mutual HA. The HA has already assigned a prefix, prefix P, to MR1, when MR2 sends a BU to the HA, requesting to be assigned a prefix. If MR2 is requesting, explicitly or implicitly, to be assigned the same prefix P, the HA should verify that MR2 and MR1 are connected to a common moving network before it accepts to assign prefix P to MR2.

Figure 3A:
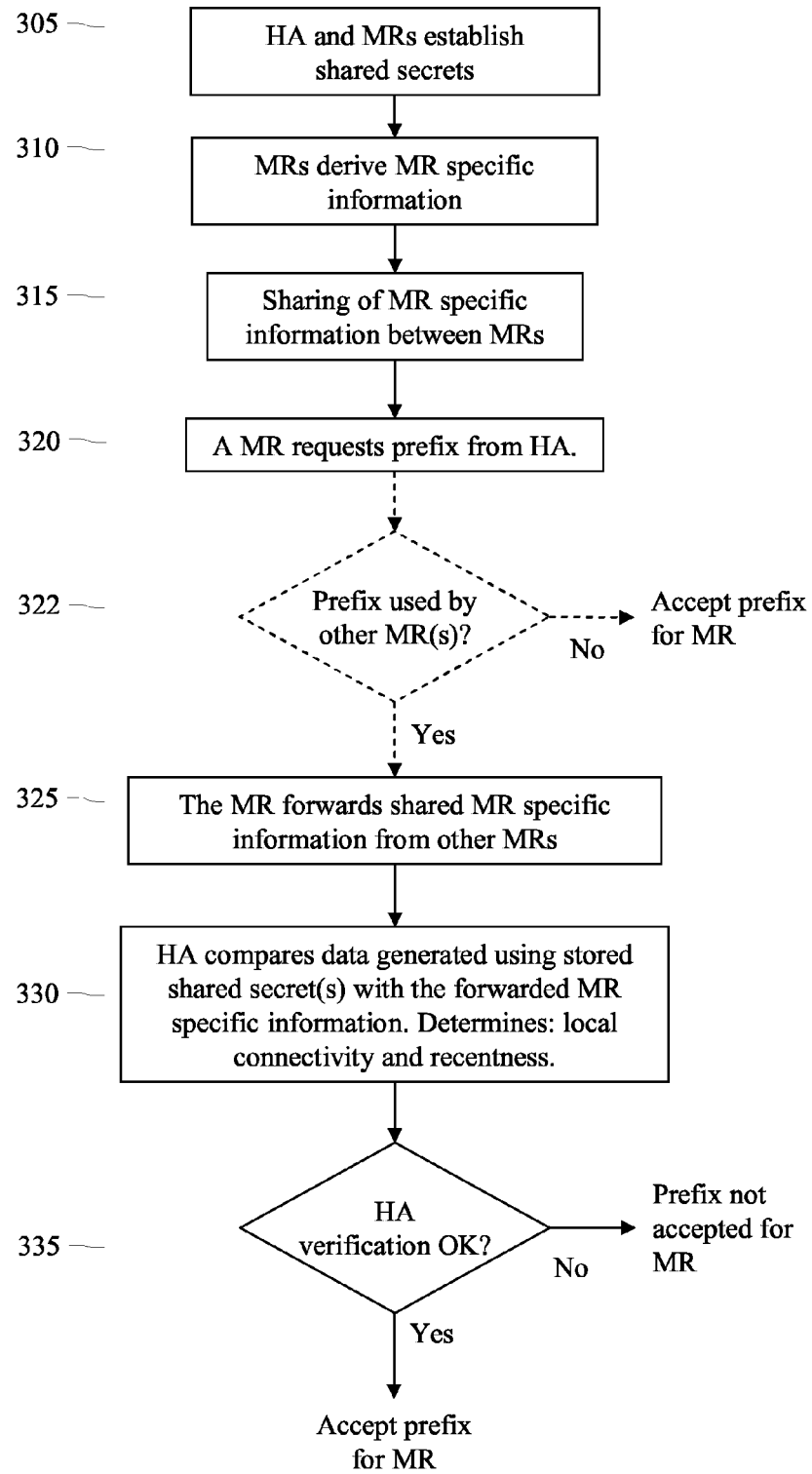
FIG. 3a is a flowchart, and 3b) a message scheme, illustrating one embodiment of the method according to the present invention.
Figure 3B:
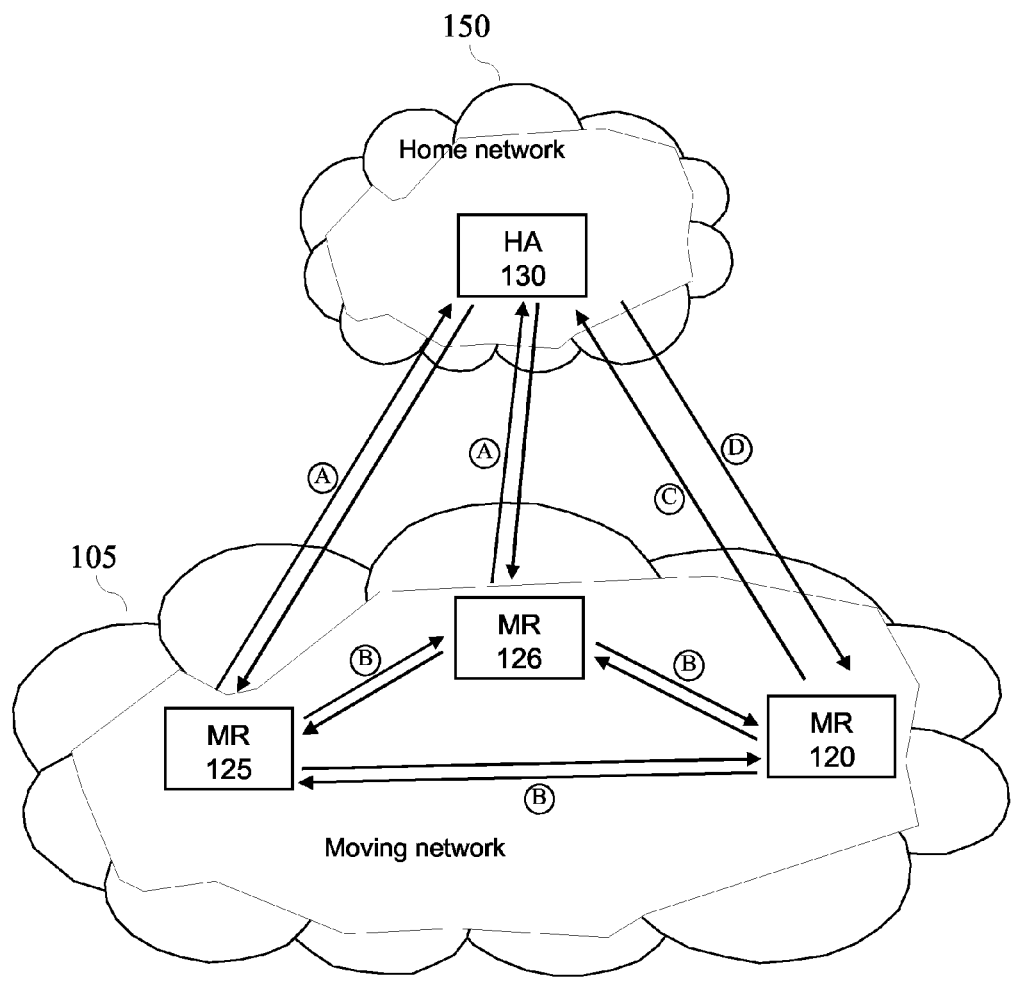

In the method according to the invention the HA needs to ensure that the MR2 and MR1 belong to the same moving network by performing a local connectivity test. In initial steps of the method the HA authenticates the MRs and verify that they are legitimate nodes in the communication system for example by an IKE/IPsec-procedure. It should be noted that the IKE/IPsec-procedure does not prevent possible fraud, malicious attacks, and errors by mistake originating from that MRs incorrectly are treated by the HA as belonging to the same moving network. This is prevented, or at least rendered more difficult, by the method of the invention, ensuring that a MRs sharing the same prefix P, belong to the same moving network. The basic method, representing a first embodiment of the invention, as illustrated in the flowchart of FIG. 3a and the schematic signaling scheme of FIG. 3b, comprises the steps of:

305: Establishing unique shared secrets between a plurality of MRs, in FIG. 3b exemplified with MR 125 and MR 126, in the moving network 105 and the HA 130 (messages A). Preferably the shared secret is established during an authentication process of the MR towards the HA. Alternatively the shared secret is preconfigured, or derived from preconfigured data. The shared secrets are unique for each MR, and stored by the HA and the respective MR. The MRs 125, 126 are assigned prefixes, which are stored by the respective MRs and the HA 130. Preferably shared secrets are established between all MRs belonging to the moving network and the HA.

310: The MRs 125, 126 derive MR specific information at least partly based on their respective shared secret.

315: Sharing of MR specific information between MRs of the same moving network (messages B). The sharing of the MR specific information should be via a message confined to the moving network, hereinafter referred to as a link-local message. The link-local message may for example be in the form of a broadcasted or multicast advertisement information message or a unicast link-local message dedicated for a certain receiving MR. The link-local message or the MR specific information should comprise timing information, an age indicator, or be sent in a manner that makes it possible to derive an age indicator, to verify the age of the MR specific information.

320: A further MR, MR 120, requests (message C) the HA 130 to assign a prefix to the MR 120, the request typically carried in a BU. The MR 120 requesting a prefix may be new to the moving network, or alternatively is established on the moving network, but wants to change/update its prefix. The MR 120 may include a prefix preference in the request message, or a prefix may be suggested by the HA 130. The prefix may be pre-configured in the MR 120 and/or the HA 130. The term "requested prefix", should be understood to encompass all these alternatives, and not restricted to the case of the MR 120 explicitly requesting a specific prefix.

325: The MR 120 requesting a prefix forwards shared MR specific information from another MR 125 or other MRs 125, 126 to the HA 130. The forwarding in association with the request may be comprised in the BU-message (message C) or in separate message or messages.

330: The HA 130 compares data generated using the in the HA stored shared secret with the forwarded MR specific information, or data derived from it, for each MR 125, 126, to determine if the forwarded MR specific information originates from the respective MR, which indicates that the requesting MR 120 belongs to the same moving network 105 as MR 125 and 126, i.e. local connectivity. The HA determines if the shared information is recent, i.e. gathered within a predetermined time period, referred to as recentness. Additionally the HA 130 verifies that the forwarded information comprises MR specific information from all MRs sharing a requested prefix, referred to as completeness or that the MR specific information is complete.

335: If verified in step 330 that the MR specific information originate from the claimed MR(s), and that the information is recent and complete, the HA 130 considers the MR 120 requesting the prefix as belonging to the same moving network and allows the MR 120 requesting the prefix to have the requested prefix assigned. If not, the MR 120 is not allowed to have the requested prefix assigned, and possibly is assigned another prefix. The verification result is communicated from the HA 130 to the MR 120 (message D).

It should be noted that the order of the above steps can be changed depending on the implementation/embodiment.

The method may comprise an optional step 322 of:

322: The HA 130 controls if the requested prefix is used by any other MR 125, 126. If so, the steps 325-335 are performed. If not, the HA 130 assigns the requested prefix to MR 120.

The shared secret may, as indicated above, be preconfigured, generated, derived or conveyed—as long as the net result is that the MR and the HA shares a piece of secret data, $D_{ss}$, that can be used as the basis for the local connectivity test.

A simple way to provided a shared secret is to have $D_{ss}$ preconfigured in the MR and in the HA. This is uncomplicated, but involves manual configuration. Automatic methods are generally preferable.

A MR always has a security relation with its HA that is used to authenticate the two nodes to each other and to secure the NEMO signaling between them. This security relation can be leveraged in various ways.

If the MR-HA security relation is based on a shared secret, instead of e.g. certificates, this shared secret can be used also as $D_{ss}$. More preferable, is to derive $D_{ss}$ from the shared secret instead of using the shared secret directly. Deriving $D_{ss}$ from the shared secret may involve performing a one-way hash function on the shared secret, possibly together with some additional data. This additional data may be an identity or an address associated with either the MR or the HA, or it may be a random number, a nonce, generated by the HA and transferred to the MR (or generated by the MR and transferred to the HA), e.g. a nonce produced and transferred during the IKE procedure for IPsec SA establishment or a new nonce transferred in the Binding Acknowledgement message (BA) (or the BU) during the Binding Update procedure, e.g. in a new mobility option.

Another possibility to leverage the MR-HA security relation is to use one of the session keys for the MR-HA IPsec SAs as $D_{ss}$ or derive $D_{ss}$ from such a session key.

Yet an alternative is to let the HA generate $D_{ss}$ and transfer it to the MR in the BA during the Binding Update procedure, e.g. in a new mobility option. The opposite is also possible, i.e. to let the MR generate $D_{ss}$ and transfer it to the HA in the BU during the Binding Update procedure, e.g. in a new mobility option. Both these options require that the mandatory IPsec source and integrity protection of the MR-HA signaling be complemented with (otherwise optional) IPsec encryption.

An automatic method that allows the MR and the HA to independently generate/derive $D_{ss}$, e.g. by leveraging the existing MR-HA security relation is preferable. Thereby both configuration and protocol extensions are avoided.

For the sharing of MR specific information in step 315 different measures can be taken to ensure that the link-local message is not conveyed outside the local link, i.e. outside the moving network. The Hop Limit field in the IPv6 header of the link-local message should be set to 0 or 1 in order to ensure that the message is not conveyed outside the moving network. It is mandated that a MR does not knowingly attempt to send a local connectivity test message to an off-link destination. For further assurance it is preferable that the address information is a link-local address. In case IPv4 is used, the Time-To-Live (TTL) field in the IPv4 header should be set to 0 or 1. As an alternative to setting the Hop Limit or TTL field to 0 or 1, it could be set to 255 (i.e. its maximum value) in the link-local message. In that case, if an MR receives a link-local message (sharing MR specific information) with a Hop Limit or TTL field with another value than 255 (which would indicate that the message has traversed a router), it should discard the message and possibly respond with a rejection or failure indication.

A second embodiment of the method according to the invention is described with reference to FIG. 4*a-b* and is relevant to the scenarios outlined with reference to FIGS. 1 and 2, involving MR2 120 and MR1 125 and their mutual HA 130. In the second embodiment a secure assignment of a common prefix for at least two MRs in the same moving network is addressed. The NEMO basic support protocol assumes that a MR is preconfigured with the prefix that is allocated to the MR from the address range of the home network (or other prefix range served by the HA). The HA may also be preconfigured with the MR's prefix, but as an optional alternative, it may instead retrieve this information from a Binding Update (BU) sent from the MR, provided that the MR includes this prefix in the Mobile Network Prefix Option specified in the NEMO basic support protocol.

According to the present invention, on the other hand, a more flexible approach is used that allows the HA to dynamically allocate a prefix to the MR. The HA may still be configured to assign a certain prefix, or one out of a set of prefixes, to a certain MR and the MR may still be configured with a preferred prefix that it expects the HA to assign, but the actual prefix assignment is performed dynamically through a binding update/binding acknowledge (BU/BA) exchange, or possibly other messages.

The MR may include its preferred prefix in the BU, but the HA is not obliged to fulfill the MR's preference and may assign another prefix to the MR. The MR may use the Mobile Network Prefix Option specified in the NEMO basic support protocol in order to convey its preferred prefix(es) to the HA. In order for the HA to know whether a MR should have a dynamically assigned prefix a new flag may be introduced in the BU to indicate this option. It would also be possible to specify a new option for "preferred prefix" that is distinguished from the existing Mobile Network Prefix Option. If the new option is used, the flag indicating dynamic prefix assignment is not needed, since the presence of the new option in the BU implicitly indicates to the HA that dynamic prefix assignment is to be used (provided that a MR needing dynamic prefix assignment always includes the new option in the BU, either to indicate a preferred prefix or using a reserved value to indicate 'no preferred prefix'). Alternatively, to be able to use the present BU message format, the MR may include its preferred prefix in the Mobile Network Prefix Option, but without using a new flag. Instead the HA would have configuration data that allows it to distinguish MRs with fixed and dynamically assigned prefixes. Using the same kind of prefix assignment, e.g. dynamic prefix assignment, for all MRs would eliminate this additional configuration data in the HA. Irrespective of which of the above methods that is used to indicate dynamic prefix assignment and preferred prefix, the HA includes the dynamically assigned prefix in the BA (or possibly in a new type of message). If the MR has indicated a preferred prefix, or if the preferred prefix is preconfigured in the HA, then the HA may omit the prefix in the BA. The MR would interpret a BA without a prefix (and without an error indication) as an assignment of the preferred prefix.

In the present embodiment the shared secret is exemplified with the use of a random sequence, a nonce, although other types of shared secrets may be used. According to the embodiment the derivation of MR specific information, sharing and forwarding of the MR specific information etc, is triggered by an action of the HA. The procedure can therefore be seen, and will be referred to, as a triggered local connectivity test.

Figure 4A:
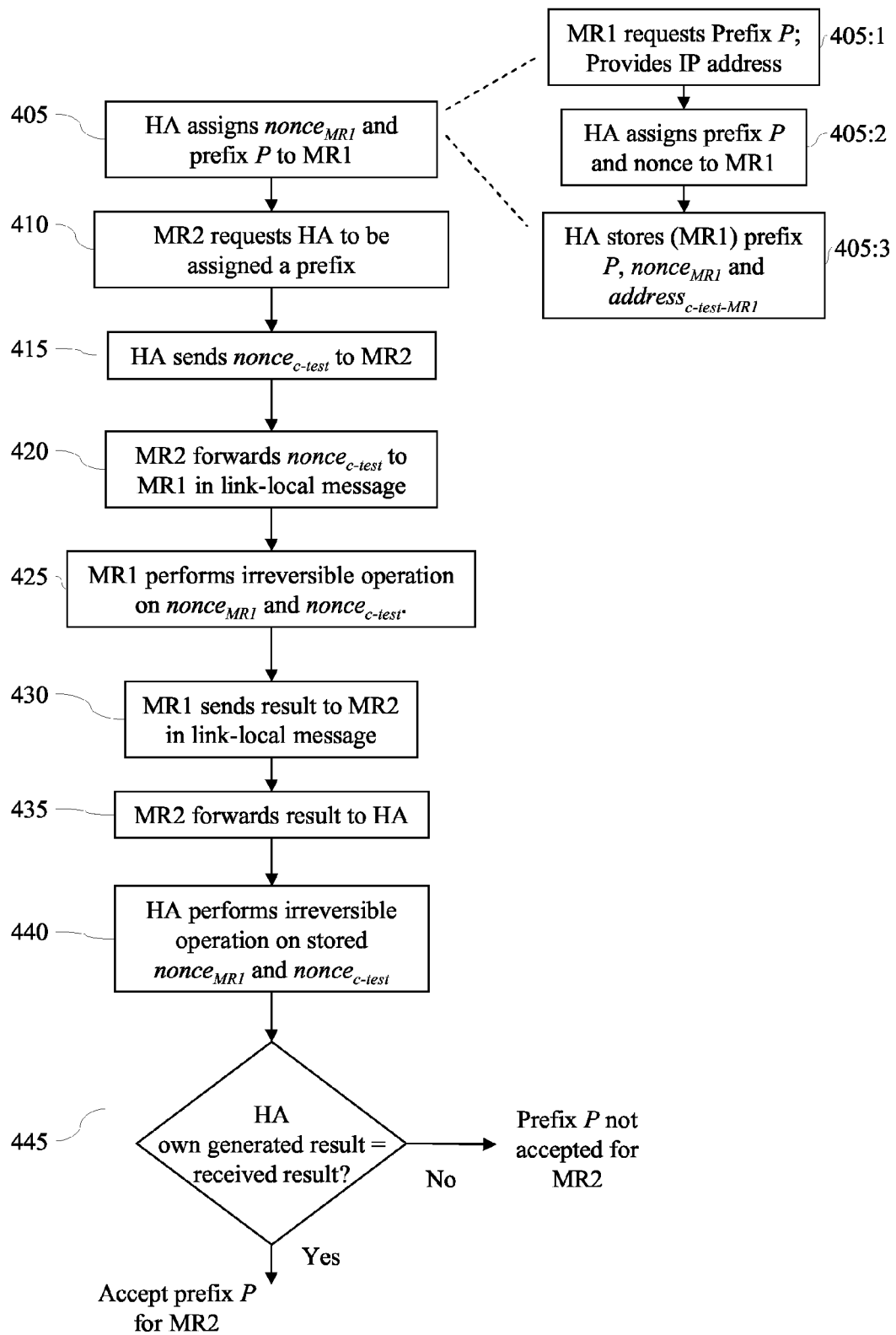
FIG. 4a is a flowchart, and 4b) a message scheme, illustrating another embodiment of the method according to the present invention.
Figure 4B:
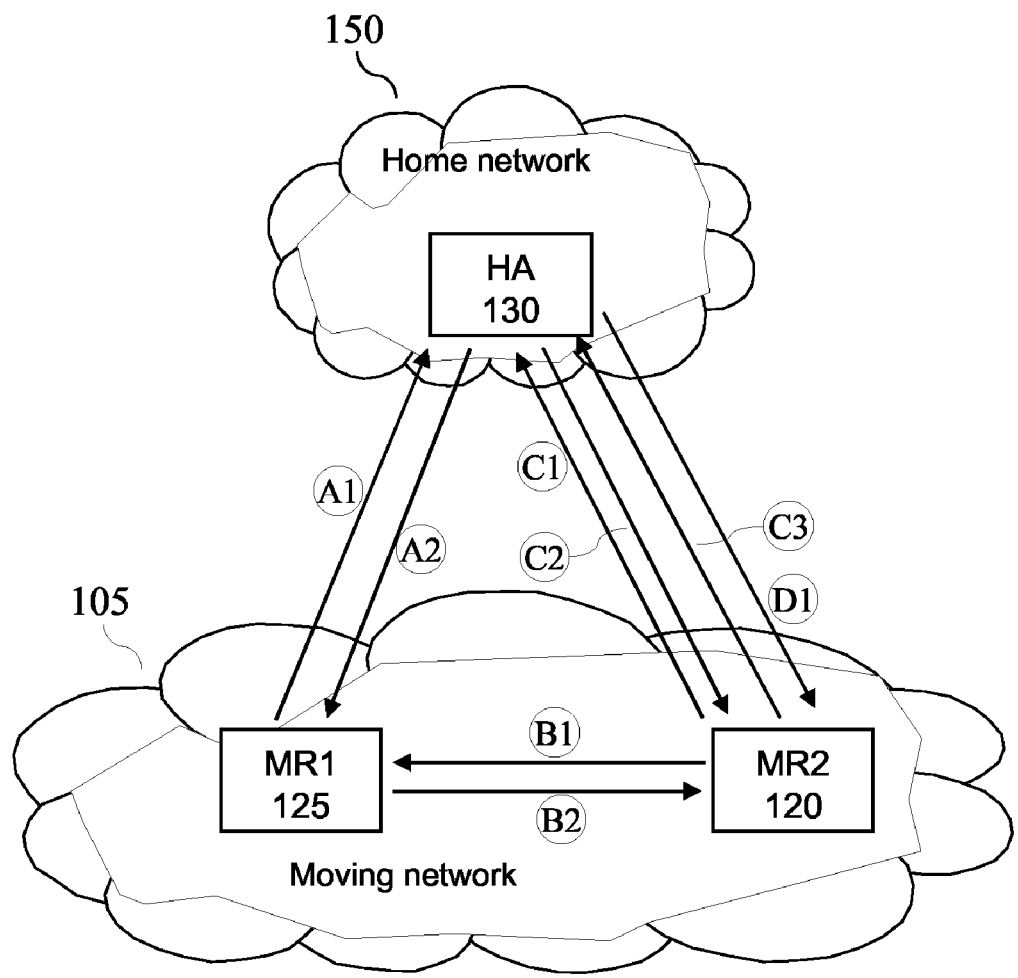

The method according to the second embodiment of the invention is illustrated in the flowchart of FIG. 4*a*, and in the message scheme of FIG. 4*b*. The numbers in parenthesis are the corresponding steps of the basic method. The method according to the second embodiment comprises the steps and sub-steps of:

| | |
|---|---|
| 405 (305): | Assigning prefix P and establishing a shared secret MR1 125-HA 130: |
| 405:1 | MR1 125 issues a BU to the HA 130 to be assigned a prefix, possibly including an implicit or explicit request to be assigned the specific prefix P (message A1). In addition, HA 130 is provided with an address to MR1, preferably an IP address, to be used for possible future local connectivity tests, denoted $address_{c\text{-}test\text{-}MR1}$. |
| 405:2 | In a BA the HA 130 explicitly or implicitly assigns prefix P to MR1 125 (message A2). In this process the HA also assigns a unique shared secret, typically a nonce, denoted $nonce_{MR1}$, to MR1 125, e.g. by including the nonce together with the prefix in the BA. A preferred way to include the nonce in the BA is to use a new (backwards compatible) mobility option. The nonce is to be used in possible future local connectivity tests. |
| 405:3 | The HA 130 stores prefix P, $nonce_{MR1}$ and $address_{c\text{-}test\text{-}MR1}$ associated with MR1 125. |
| 410 (320): | Another MR, MR2, requests the HA to assign a prefix to the MR2: Subsequently the HA 130 receives a request from MR2 120 to have a prefix assigned (message C1). MR2 120 may explicitly indicate that it |

-continued

| | |
|---|---|
| | prefers prefix P or the HA 130 may suggest prefix P, deduced from configuration data. |
| 415: | The HA determines which other MR(s), if any, that have already been assigned the requested prefix, prefix P. In this example the HA determines that MR1 125 is the only other MR currently using the requested prefix, prefix P. The HA 130 then requests MR2 120 to perform a local connectivity test towards MR1 125 (message C2). To initiate the local connectivity test the HA 130 sends a unique one-time data, typically a second nonce, denoted $nonce_{c\text{-}test}$, to MR2 120 together with $address_{c\text{-}test\text{-}MR1}$. |
| 420: | MR2 120 sends a "local connectivity test message" to MR1 125, addressed to $address_{c\text{-}test\text{-}MR1}$, comprising $nonce_{c\text{-}test}$ (message B1). The local connectivity test message should be a link-local message complying with the previously described properties of such messages. |
| 425 (310): | Derive MR specific information at least partly based on the shared secret ($nonce_{MR1}$): Assuming that the local connectivity test message is received with the correct destination address, MR1 125 performs an irreversible operation on $nonce_{MR1}$ and $nonce_{c\text{-}test}$. |
| 430 (315): | Sharing of MR specific information: MR1 125 responds to the local connectivity test message by sending the result of the irreversible operation, denoted irreversible-op-$result_{MR1\text{-}c\text{-}test}$, to MR2 120 (message B2). Also this message is a link-local message. |
| 435 (325): | Forwarding of shared MR specific information to the HA: MR2 120 forwards irreversible-op-$result_{MR1\text{-}c\text{-}test}$ to the HA 130 (message C3). |
| 440 (330): | The HA verifies origin, recentness and completeness of the MR specific information by comparing with stored information associated with MR1 or by comparing with data generated using stored information associated with MR1: The HA 130, knowing both $nonce_{MR1}$ and $nonce_{c\text{-}test}$, verifies that irreversible-op-$result_{MR1\text{-}c\text{-}test}$ is correct by performing the same irreversible operation on $nonce_{MR1}$ and $nonce_{c\text{-}test}$ as performed by MR1 125 in step 425. An agreement indicates that MR2 120 and MR1 125 are connected to the same moving network. |
| 445 (335): | If verified that the MR1 125 and MR2 120 are connected to the same moving network and that no other MR has been assigned prefix P, the HA 130 then accepts to assign prefix P to MR2 120 and indicates this in a response to the request from MR2 (message D1). If the local connectivity test fails, i.e. if the HA 130 cannot verify irreversible-op-$result_{MR1\text{-}c\text{-}test}$ then the HA 130 rejects the request from MR2 120 to have prefix P assigned and may assign an alternative prefix to MR2 120. |

In the second embodiment recentness of the gathered MR specific information, the irreversible-op-$result_{MR1\text{-}c\text{-}test}$, is ensured in that the procedure is triggered by the HA (step 415), including the unique one-time data, $nonce_{c\text{-}test}$. Thus, the irreversible-op-$result_{MR1\text{-}c\text{-}test}$ also serves as an age indicator. The HA may for example start a timer when the $nonce_{c\text{-}test}$ is generated, or sent, to MR2 120 (step 415, message C2), and in the comparing step 440 determine if the irreversible-op-$result_{MR1\text{-}c\text{-}test}$ was received within a pre-determined time limit.

The irreversible operation, utilized in step 425 to derive the MR specific information, the irreversible-op-$result_{MR1\text{-}c\text{-}test}$, and in step 440 to verify the origin of the MR specific information, should here be interpreted as an operation as such for example a specific algorithm, not including the parameters used by the operation. The irreversible operation should be so designed that a specific input parameter, or set of parameters, will always yield the same result, whereas another input parameter, or parameters, will yield another result (or at least with very low probability yield the same result) and wherein the input parameter is not derivable from the result. Such irreversible operations are known in the art. Suitable irreversible operations include, but are not limited to: a hash operation like MD5 or SHA-1 e.g. computed over $nonce_{MR1}$ concatenated with $nonce_{c\text{-}test}$ (and possibly concatenated with another fixed string or padding if required by the operation).

If the irreversible operation requires a secret key, then $nonce_{MR1}$ may be used as the secret key. Other secret key alternatives include the pre-shared secret on which the MR1-HA security relation is based (if such a pre-shared secret is used) or a key derived from this pre-shared secret. As will be further discussed below, the irreversible configuration may be pre-configured, agreed upon during the authentication procedure between the MR and the HA, or communicated in some other secure manner. Alternatively the MR and the HA is provided with a plurality of different algorithms irreversible operations and an indication of which to use/has been used is included in the link-local messages.

In order for the local connectivity test to be secure, the nonce, $nonce_{MR1}$, sent from the HA to MR1 in step 405 must be kept a secret shared by only MR1 and the HA. Otherwise it would be possible for any node that has gained access to the nonce to impersonate MR1 during a local connectivity test. This means that the assignment of the nonce also must be performed in a secure way. There are several ways to achieve this.

A convenient and preferred way to achieve secure nonce assignment is to rely on IPsec protection (including message authentication, integrity protection and encryption) of the BU/BA exchange. IPsec protection of the BU/BA exchange is mandated in the previously cited "Mobility support in IPv6" and in "Using IPsec to Protect Mobile IPv6 Signaling Between Mobile Nodes and Home Agents" by J. Arkko et al., RFC 3776, June 2004. However, the only required protection is message authentication and integrity protection. Other types of protection, e.g. encryption, are optional. Thus, to ensure secure nonce assignment MR1 and the HA must, in addition to the IPsec protection mandated in the above cited documents, encrypt the BU/BA exchange. This is easily achieved since the security relation that the session keys are based on (for message authentication, integrity protection as well as encryption) is already in place.

A number of conceivable alternative methods that do not require encryption of the BU/BA exchange are present, including:

Instead of transferring the actual nonce from the HA to MR1, the HA transfers only a bit string, a "pre-nonce", that is to be used as input data in a procedure that derives the actual nonce. The nonce is then derived by performing an operation on the pre-nonce involving a secret that is shared between the HA and MR1. The secret is preferably the session key used for integrity protection of the BU/BA exchange, but it could also be a pre-shared secret on which the MR1-HA security relation is based or a bit string derived from any of these. The operation may be e.g. a plain encryption or a hash of the per-nonce concatenated with the secret bit string.

MR1 and the HA use a Diffie-Hellman exchange to arrive at a shared secret bit string representing the nonce. MR1 would then preferably supply its part of the Diffie-Hellman exchange in a (backwards compatible) mobility option in the BU. The HA would preferably supply its corresponding piece of data in a (backwards compatible) mobility option in the BA.

The nonce, but not the rest of the message, is encrypted when transferred from the HA to MR1. The nonce may be encrypted using the session key used for integrity protection of the BU/BA exchange, but the encryption key could also be a pre-shared secret on which the MR1-HA security relation is based or a bit string derived from any of these.

As an alternative to the above described generation of the unique one-time data, in the HA, the MR2, instead of the HA, may generate the unique one-time data, i.e. the nonce$_{c\text{-}test}$ parameter. In the interaction between MR1 and MR2 the nonce$_{c\text{-}test}$ parameter is used exactly as in the described variant of the procedure. MR2 must however send nonce$_{c\text{-}test}$ together with the test result to the HA, so that the HA can verify that the result is actually produced by MR1.

The local connectivity test address, denoted address$_{c\text{-}test\text{-}MR1}$, provided by the MR1 in step 405:1 must be associated with an interface of MR1, on which the concerned prefix P is to be announced, i.e. an interface towards the moving network of MR1 (i.e. it cannot be the care-of address of MR1). The address may e.g. be included in the BU (message 1). The local connectivity test address should preferably be a link-local address. If the local connectivity test address is not a link-local address and if it has to be provided to the HA before the prefix is actually assigned (which is the case if a BU/BA exchange is used for the prefix assignment), then MR1 supplies only the non-prefix part of the address, i.e. interface identifier in IPv6 (details regarding the IPv4 case will be further discussed below. The actual local connectivity test address is then formed by appending the non-prefix part to the assigned prefix. The preferred way to include the local connectivity test address (or its non-prefix part) in the BU is to use a new (backwards compatible) mobility option.

For the link-local message "local connectivity test message" sent by MR2 to MR1 in step 420 the measures previously described concerning link-local messages should be taken to ensure that the message is not conveyed outside the local link. For further assurance it is preferable that address$_{c\text{-}test\text{-}MR1}$ is a link-local address.

If MR1 receives a local connectivity test message with another destination address then address$_{c\text{-}test\text{-}MR1}$, it should discard the message and possibly respond with a rejection or failure indication.

The same rules as regards to the Hop Limit (or TTL) field and off-link destinations apply to the response message "irreversible-op-result$_{MR1\text{-}c\text{-}test}$" sent by MR1 in step 430 as to the local connectivity test message.

The above described embodiment can be extended to also encompass more than two MRs belonging to the same moving network and sharing the same prefix P. If more than one MR have already been assigned a requested prefix, the connectivity test has to be performed successfully towards each of them before the HA accepts to assign the same prefix to yet a MR. However, even though steps 420 to 430 (message B1 and message B2) have to be executed multiple times (once for each MR that has already been assigned the requested prefix), the messages of steps 415 and 435 (message C2 and message C3) only have to be exchanged once between the HA and MR2. The HA can include nonce$_{c\text{-}test}$ and address$_{c\text{-}test\text{-}MRX}$ parameters for all the concerned MR2 in a single message and similarly MR2 can include the irreversible-op-result$_{MR1\text{-}c\text{-}test}$ parameters for all the concerned MRs in a single message. It is even possible to reuse the same nonce$_{c\text{-}test}$ parameter for all the local connectivity tests.

The described embodiment does, in addition to fulfill the requirements of facilitating the use of multiple MRs in a moving network, have the advantages that it is independent of the authentication mechanism used between the MR and the HA.

The basic way to apply the local connectivity test according to this embodiment is, as previously described, in combination with a Binding Update procedure in order to ensure that a prefix is not assigned to a MR that is not connected to the same moving network as the other (possible) MRs that have already been assigned the prefix.

It is however conceivable to apply the local connectivity test independently of the Binding Update procedure, i.e. as a stand-alone mechanism. One such application could be to allow the HA to monitor the connectivity status among the MRs that share a prefix assigned by the HA.

The HA could then at any time request a MR to perform a local connectivity test towards the other MRs sharing the same prefix and/or, if desired, to further other MRs. The messages and mechanisms used in this process would be the same as previously described when the local connectivity test is applied in conjunction with a Binding Update procedure. That is, a stand-alone local connectivity test would consist of messages C2, B1, B2 and C3 in FIG. 4b, and the parameters nonce$_{MR1}$ (i.e. the long-lived nonce), nonce$_{c\text{-}test}$ (i.e. the one-time nonce) and the local connectivity test address would be used as before. The initial preparation, or "bootstrapping", for the test, i.e. when the HA and a MR exchange long-lived nonce and local connectivity test address (messages A1 and A2 in FIG. 4b) is however still assumed to be done in conjunction with a Binding Update procedure. Alternatively, dedicated messages can be used for this exchange or the long-lived nonce and the local connectivity test address can be derived without an explicit data exchange as will be described below.

Extension for Multi-Homed MRs

The "triggered" local connectivity test according to the present invention may be adapted also to take into account that a MR may be connected to more than one moving network, via different interfaces, simultaneously, i.e. that it may be multi-homed in terms of moving network attachments. Such a multi-homed MR will have more than one prefix assigned and it will use different prefixes in its different moving networks. In order to know whether a successful local connectivity test towards such a multi-homed MR is relevant, a HA needs to know to which prefix(es) the test result pertains. That is, the HA needs to know which prefix(es) the multi-homed MR is using in the moving network where the local connectivity test was performed.

Consider for instance an example with MR A being multi-homed with interfaces in two different moving networks. In one moving network it is using prefix MNP1 and in the other moving network it is using prefix MNP2. Then MR B connects to the moving network where MR A is using MNP1 and sends a BU to its HA (which it has in common with MR A), requesting to have prefix MNP1 assigned. The HA asks MR B to perform a local connectivity test towards MR A and MR B sends a local connectivity test message to MR A. If the result that MR A returns would have pertained to all of its assigned prefixes, then MR A could have generated and returned a result in the manner previously described. However, since MR A is only using one of its two prefixes in the moving network where the local connectivity test is performed, such a regular response would not suffice. MR A has to somehow indicate which of its prefixes that the response pertains to.

To accomplish this MR A modifies the $nonce_{c\text{-}test}$ parameter using MNP1 before generating and returning the irreversible-op-$result_{MR\text{-}A\text{-}c\text{-}test}$ parameter. Together with the irreversible-op-$result_{MR2\text{-}c\text{-}test}$ parameter MR A includes a list of the concerned prefixes, in this example only MNP1. MR B forwards the result, including the prefix list, to the HA. When the HA receives the test result, it knows from the included prefix list which prefix(es) the test result is relevant for. The HA also uses the prefix list to modify the $nonce_{c\text{-}test}$ parameter in the same way as MR A before verifying the irreversible-op-$result_{MR\text{-}A\text{-}c\text{-}test}$ parameter.

Since MNP1 was included in the returned result message, the HA can accept to assign MNP1 to MR B (provided that the irreversible-op-$result_{MR\text{-}A\text{-}c\text{-}test}$ parameter was successfully verified). If, on the other hand, the returned result message would have included MNP2, but not MNP1, then the HA would not have accepted to assign MNP1 to MR B.

There are several possible options for the modification of the $nonce_{c\text{-}test}$ parameter. One way could be to simply concatenate the $nonce_{c\text{-}test}$ parameter with the concerned prefixes. This would however change the length of the $nonce_{c\text{-}test}$ parameter, which may be a disadvantage, depending on the nature of the irreversible operation. Another way would be to first concatenate the prefixes and then perform a bitwise XOR ("eXclusive OR") operation on the concatenated prefixes and the $nonce_{c\text{-}test}$ parameter. If the prefix concatenation is shorter than the $nonce_{c\text{-}test}$ parameter, it is prepended or appended with a number of bits set to zero, so that the length matches the length of the $nonce_{c\text{-}test}$ parameter, before the XOR operation is performed. If the prefix concatenation is longer than the $nonce_{c\text{-}test}$ parameter, the $nonce_{c\text{-}test}$ parameter may instead be extended in the same way. However, if changing the length of the $nonce_{c\text{-}test}$ parameter is to be avoided, then the prefix concatenation could instead be hashed (using the appropriate padding or truncation of the hash result if needed) into the same length as the $nonce_{c\text{-}test}$ parameter before the XOR operation.

Various other methods to modify the $nonce_{c\text{-}test}$ parameter are also possible. The requirement is that all the concerned prefixes affect the modification in a deterministic manner that can be repeated by the HA with only the prefix list and the original $nonce_{c\text{-}test}$ parameter as dynamic input data to the operation. One consequence of this requirement is that if more than one prefix is included in the prefix list, then the order in which the prefixes appear in the list should indicate the order in which they were used in the modification of the $nonce_{c\text{-}test}$ parameter.

Simultaneous Testing of Multiple MRs Using Multicasting

This alternative embodiment is beneficial when more than one MR is already using the prefix when the local connectivity test is to be performed. Thus the example scenario is extended with a third MR, MR3. We assume that the HA has already assigned the prefix to MR3, in addition to MR1, when MR2 sends its BU to the HA.

The basic variant of the local connectivity test states that when multiple MRs are to be tested, MR2 has to exchange unicast test/result messages with each of MRs to be tested, whereas a single message exchange is enough between the HA and MR2 in order to request the tests and return their results.

In this variation the multiple unicast message exchanges between MR2 and the other MRs is replaced be a simplified message exchange consisting of a single multicast test message from MR2 followed by unicast response messages from the MRs receiving the test message.

Since MR2 sends the test message to a multicast group, e.g. a multicast group for all mobile routers (or possible the already existing multicast group for all routers), the HA does not have to provide MR2 with local connectivity test addresses. The $nonce_{c\text{-}test}$ parameter may be generated by either the HA (as in the basic variant) or MR2 (as in the variation described above). The same $nonce_{c\text{-}test}$ is used in the test towards all the MRs.

When MR2 receives the responses from the other MRs, i.e. MR1 and MR3 in the extended example, it is preferable that MR2 can explicitly match the responses with the multicast test message (although confusion is unlikely given that the responses are unicast and that MR2 is unlikely to have more than one local connectivity test ongoing simultaneously). Explicit matching could be achieved by a unique transaction identifier that is included both in the test message and in the responses. Such a transaction identifier could be e.g. a sequence number generated by MR2 (and copied by MR1 and MR3 into the response messages) or the $nonce_{c\text{-}test}$ parameter (in which case MR1 and MR3 would return $nonce_{c\text{-}test}$ in their response messages). If $nonce_{c\text{-}test}$ is used as a transaction identifier, it effectively has dual purposes, both as a replay protector and as a transaction identifier.

MR2 collects all test results from the response messages it receives (i.e. from MR1 and MR3) and sends them in a single message to the HA. In order for the HA to know which MR that has generated the respective test results an identity of the generating MR has to be associated with each test result. Preferably the home address of a MR is used as this identity, but it is also possible to use the local connectivity test address (i.e. preferably the link-local address) of the MR or another type of identity, e.g. a NAI, that the MR uses in its MR-HA security relation. If the local connectivity test address is used as the MR identification, then MR2 could extract this address from the source address field of the IP header of the response message (provided that MR1 and MR3 use their respective local connectivity test addresses as the source address of the response message). Otherwise, MR1 and MR3 have to include their respective identity in the response messages. In either case MR2 has to include the identities of MR1 and MR3 associated with the test results from MR1 and MR3 in the message to the HA. Preferably MR1 and MR3 provides their home addresses as identification in their response messages and MR2 includes these home addresses in the message to the HA.

If the local connectivity test address is not used as MR identifier, then a MR does not have to provide the HA with a local connectivity test address in the BU, as described in the basic variant of the test.

MR2 may repeat the multicast test message several times for redundancy within a certain time period $T_P$. The unicast response messages could be sent reliably or unreliably. Reliable sending could utilize, e.g. TCP or a retransmission mechanism designed into the test itself. In the latter case the sender repeats the response message until an acknowledgement is received. When a reliable response is used a MR should ignore any test message that is received within a time period $T_P$ after an identical test message on which the MR has already reacted. If unreliable responses are used a MR should respond to all received test messages.

The MRs receiving the multicast test message may use a (short) random delay before sending the unicast response message in order to avoid collisions with response messages from other MRs. A MR may omit the random delay if it knows/believes that there are no other MRs in the moving network than itself and the MR sending the multicast test message.

Advantages of this variation include speed and resource efficiency, both due to that multiple sequential unicast messages are replaced by a single multicast message. Additional advantages are that no local connectivity test address is needed (unless it is used as MR identification) and that the HA does not have to list the MRs to be tested when asking MR1 to perform the tests.

A third embodiment of the invention utilizes an advertisement mechanism for sharing the MR specific information between MRs in the moving network. The advertisement mechanism utilizes a broadcasted, or multicast, message, and therefore this embodiment will be referred to as broadcast local connectivity test. By the advertisement mechanism, a MR can announce its presence to other MRs in the moving network, thus indicating local connectivity between the MRs, in a way that can be retroactively verified by the HA.

The relationship between the MR and the HA consists of a shared secret that is mutually known by the two nodes. The shared secret may be preconfigured (or derived from preconfigured data), provided to the MR by the HA, provided to the HA by the MR or mutually derived, e.g. during an authentication procedure, between the MR and the HA, as described above. In this embodiment the shared secret is exemplified with a shared secret data, $D_{ss}$.

Using the $D_{ss}$ the MR generates advertisement information that it broadcasts or multicasts to other MRs in the local network. The advertisement information changes periodically or with each advertisement message.

Another MR receiving the advertisement information can present it to the HA (that it has in common with the originator of the information) to provide evidence of local connectivity to the MR that originated the advertisement information.

Aided by the shared secret data the HA can verify that the presented advertisement information originates from the claimed MR as well as deduce its recentness. Provided that the originator of the advertisement information is indeed the claimed MR and provided that the information is recent enough, the HA accepts it as an indication of local connectivity between the MR presenting the advertisement information and the MR that originated it.

Figure 5A:
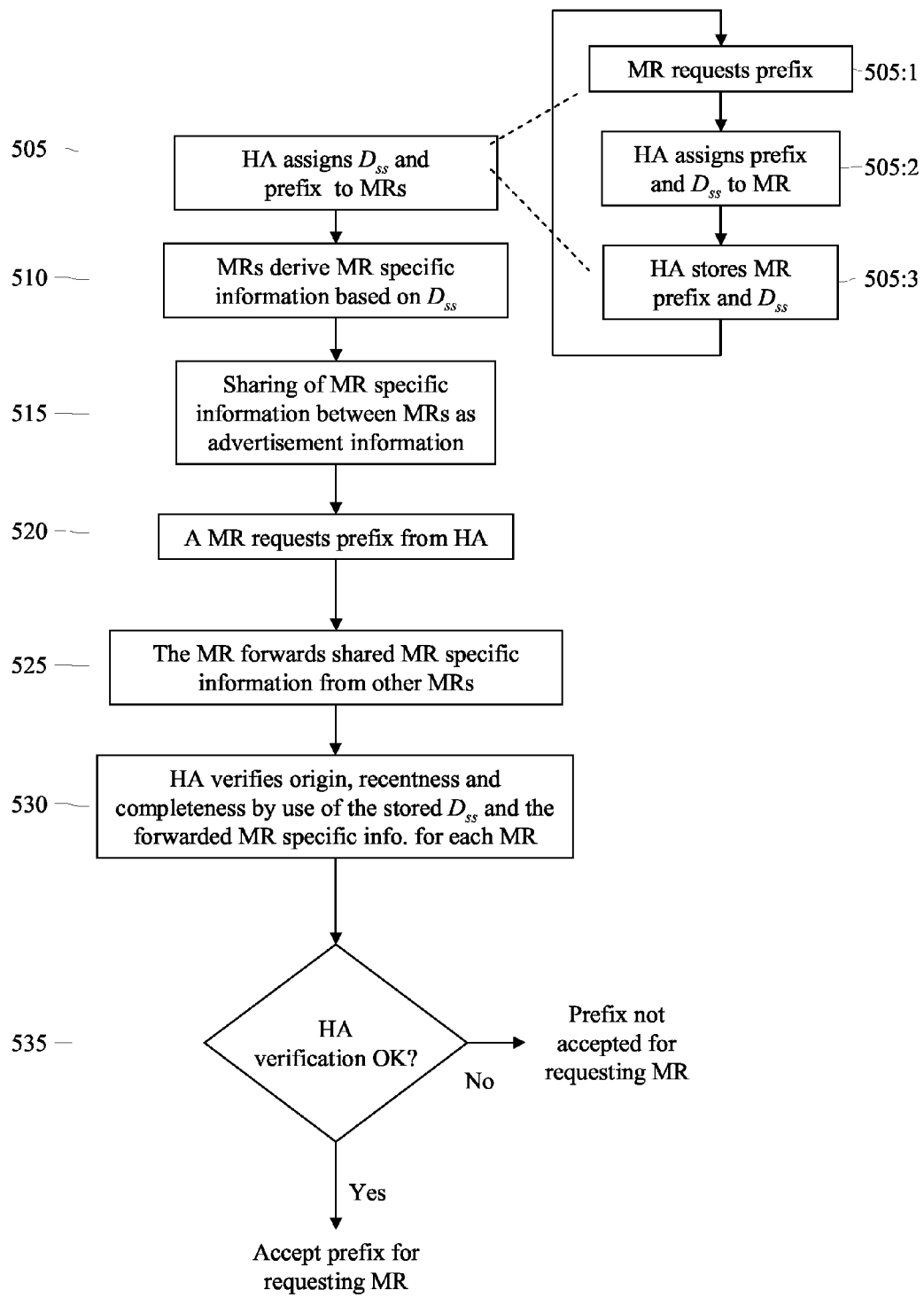
FIG. 5a is a flowchart, and 5b) a message scheme, illustrating still another embodiment of the method according to the present invention. The message scheme of 5c) illustrates an alternative implementation of the embodiment.
Figure 5B:
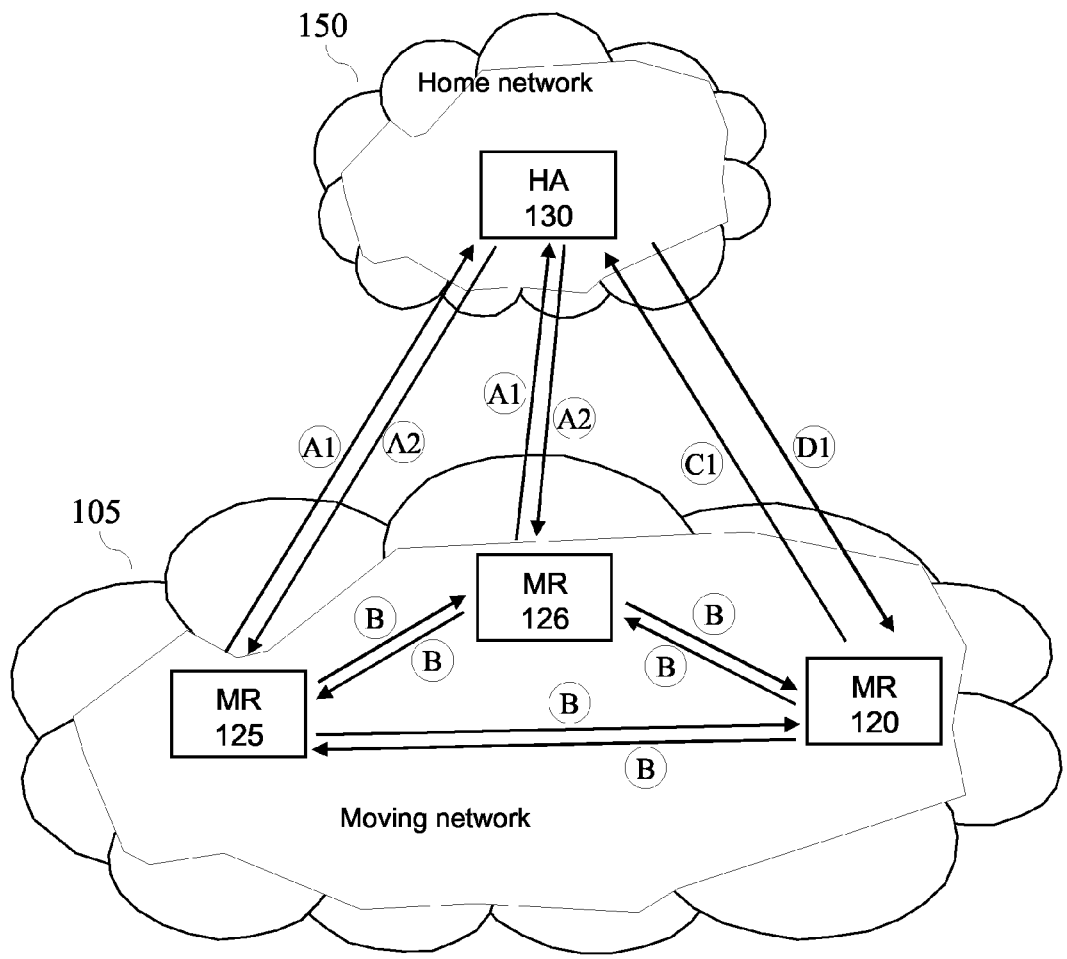

The method according to the third embodiment of the invention is illustrated in the flowchart of FIG. 5a, and in the message scheme of FIG. 5b. The numbers in parenthesis are the corresponding steps of the basic method. The method according to the second embodiment comprises the steps and sub-steps of:

| | |
|---|---|
| 505 (305): | Assigning prefixes and establishing shared secrets between the MRs 125, 126 and the HA 130. The substeps 505:1-3 are repeated for each MR in the moving network: |
| 505:1 | The MR issues a BU to the HA 130 to be assigned a prefix (messages A1). |
| 505:2 | In a BA the HA 130 explicitly or implicitly assigns the prefix to the MR (messages A2). In this process the HA 130 and the MR establish the shared secret data $D_{SS}$ (unless it is preconfigured). The $D_{SS}$ is to be used in possible future local connectivity tests. |
| 505:3 | The HA 130 stores the $D_{SS}$ and the prefix, associated with the MR. |
| 510 (310): | The MRs 125, 126 derive MR specific information, the advertisement information, at least partly based on their respective $D_{SS}$. The advertisement information should further comprise an identity associated with the MR and an age indicator, which can be used to asses the age of the MR specific information. Various alternatives for the advertisement information will be described in detail below. |
| 515 (315): | Sharing of MR specific information between the MRs of the same moving network, by each MR broadcasting or multicasting its advertisement information in link-local messages to the other MRs (messages B). Alternatives for the broadcasting/multicasting procedure will be given below. |
| 520 (320) | A MR 120 requests (message C1) the HA 130 to be assigned a prefix, or to be reassigned a prefix, in a BU. Note that the term "requests" should be interpreted as previously explained in conjunction with step 320 of the first embodiment. |
| 525 (325): | The MR 120 requesting a prefix forwards shared MR specific information from another MR 125 or other MRs 125, 126 to the HA 130. The forwarding in association with the request may be comprised in the BU-message (message C1) or in a separate message or messages. |
| 530 (330): | The HA 130 compares the stored $D_{SS}$, or data derived from it, associated with each MR 125, 126, with the forwarded MR specific information, or data derived from it, in order to verify that the forwarded MR specific information originates from the respective MR. |

| | |
|---|---|
| | Alternatively, the HA 130 considers only the MRs, and their associated forwarded MR specific information, that have been assigned the prefix that the HA 130 is considering to assign to the MR 120. The HA further analyses recentness of the forwarded MR specific information by extracting the age indicator(s) comprised in, or derivable from, the relevant MR specific information. Additionally the HA verifies that the forwarded information comprises MR specific information from all MRs sharing the same prefix as the HA 130 is considering to assign to the MR 120, referred to as completeness. |
| 535 (335): | If verified in step 530 that the specific MR information originate from the claimed MRs, and also recentness and completeness are verified, the HA accepts the BU and assigns (or reassigns) the requested prefix to the MR by returning a BA (message D1). If the HA determines that the MR does not have local connectivity to all the other MRs that are currently assigned the requested prefix (or if the MR for some other reason is not authorized to use the prefix), the HA may assign an alternative prefix to the MR by returning a BA including the alternative prefix. Alternatively the HA may reject the BU by sending a BA indicating that the BU was rejected. |

Note that the steps do not have to be taken at the same time. For example, the step of authenticating and/or establishing a $D_{ss}$ for each MR (step 505) can preferably be done when each MR first appears on the moving network, the steps of advertising, or sharing MR specific information (step 515) is preferably performed at regular intervals, and the steps of assigning a prefix to another MR (steps 520-535) is taken on demand.

The Advertisement Information

The advertisement information is an important element in the broadcast local connectivity test, i.e. the information that a MR distributes to other MRs in order to announce its presence and which can be verified by the HA. As indicated above the advertisement information must contain an identity associated with the MR and a piece of data, the age indicator, that the HA can use to assess the age of the information.

The MR identity should be an identity that the HA knows, preferably the one that the MR uses when authenticating itself to the HA, e.g. the MR's home address or a Network Access Identifier, NAI.

In addition, the information may be signed using $D_{ss}$ as the key (or a key derived from $D_{ss}$), which means that a digital signature is included too, or protected by a message authentication code, MAC, that ensures source integrity for the information, i.e. which proves to the HA that the advertisement information indeed originates from the MR whose identity is included in the information.

Optionally a MR could include the advertisement period, i.e. the time interval between two consecutive advertisement messages, that the MR is using, or the advertisement information update period, i.e. the period with which the advertisement information (in particular the age indicator) is updated. This may be useful to the HA when it assesses the recentness of the advertisement information. It is preferred to keep this as an optional data field in the advertisement information. That way it can be used by implementers, users, organizations and/or operators, who feel a need for such flexibility, whereas those who are satisfied with pre-configuration in the HA can omit the data field and thereby keep the advertisement information somewhat smaller and the implementation somewhat simpler.

Yet an option is to include the prefix(es) that is/are relevant for the advertisement information. This is however not required to allow the HA to verify the advertisement information, since the HA already knows which prefix(es) that is/are assigned to each of the MRs that are registered in the HA. Other MRs receiving the advertisement information, on the other hand, know from the router advertisements what prefix(es) the MR is using, but could potentially benefit from knowing which of these prefixes that the advertisement information pertains to (in case they are not all the same). It is also useful if the MR originating the advertisement information is multi-homed, having interfaces in more than one moving network, and is using different prefixes in the different moving networks. Then the HA needs to know which prefix(es) the advertisement information pertains to, in order to be able to verify local connectivity to the relevant interface of the multi-homed MR. Consider for instance an example with MR A being multi-homed with interfaces in two different moving networks. In one moving network it is using prefix MNP1 and in the other moving network it is using prefix MNP2. Then MR B connects to one of MR A's moving networks and sends a BU to its HA (which it has in common with MR A), requesting to have prefix MNP1 assigned. MR B includes advertisement received from MR A in the BU, so that the HA can verify the local connectivity between MR B and MR A. In this situation the HA needs to know which prefix the advertisement information from MR A pertains to in order to determine whether it can accept to assign MNP1 to MR B. If the advertisement information pertains to MNP1, indicating that MR A is using MNP1 in the moving network of MR B, then the HA can accept to assign MNP1 to MR B. But if the advertisement information pertains only to MNP2 and not to MNP1, indicating that MR A is using MNP1 in another moving network, then the HA will not accept to assign MNP1 to MR B.

Furthermore, including the relevant prefix(es) in the advertisement information may be more beneficial in moving networks where the layer 1 and layer 2 media do not allow all MRs to hear each other directly.

In moving networks where all MRs cannot hear each other it may also be useful (depending on which alternatives and options that are selected for the solution in general) to include a sequence number that is increased every time the advertisement information is updated.

For the age indicator different alternatives can be envisaged:

Using Signed Timestamps or Sequence Numbers

An age indicator may be provided in step 510, by using signed timestamps, where the timestamp indicates the time that has passed since the last time the MR performed a Binding Update procedure or since the prefix was assigned. If the timestamp indicates the time since the prefix was assigned, the timestamp must be accompanied by the concerned prefix and there may be more than one such timestamp-prefix pairs in the advertisement information, since the MR may be assigned more than one prefix.

With the timestamp method a digital signature or a MAC is used to prove to the HA that the originator of the advertisement information is actually the MR whose identity is included in the information. The signature or MAC is preferably computed over the entire advertisement information using $D_{ss}$ (or a key derived from $D_{ss}$) as the signing/integrity key.

When the HA receives the advertisement information (step 525), it first extracts the included MR identity in order to find the relevant $D_{ss}$. Using the $D_{ss}$ the HA then verifies the digital signature or MAC in order to authenticate the originator of the advertisement information and in order to verify that the information has not been altered since it left its originator. If this is successful, the HA knows that at the time the advertisement information was sent from its originator, as indicated by the included timestamp(s), there was local connectivity between the sending and the receiving MR. Since this is not proof of current local connectivity, a maximum age, $T_{max-age}$, of the local connectivity proof must be defined or pre-determined, that the HA accepts in order to allow the two MRs to share the same prefix.

The HA then checks the timestamp(s) to determine whether the advertisement information is recent enough. The HA would accept a timestamp no older than $T_{max-age}$, where $T_{max-age}$ must be greater than the advertisement period the MR is using. $T_{max-age}$ may be a fixed preconfigured value, in which case the MR may use any advertisement period that is smaller than $T_{max-age}$ (with a certain margin). The MR does not even have to use a consistent advertisement period. It may use a variable time interval between its advertisements, as long as the time interval between two consecutive advertisements does not exceed $T_{max-age}$ (with a certain margin). Alternatively, $T_{max-age}$ may not be a fixed preconfigured value in the HA. Instead the MR may have a fixed advertisement period that it includes in the advertisement information (or a variable advertisement period whose maximum value is included in the advertisement information). Then the HA would dynamically set $T_{max-age}$ to a value that is (slightly) greater than the advertisement period indicated in the received advertisement information. The margin between $T_{max-age}$ and the advertisement period is chosen in relation to the accuracy of the synchronization that can be expected between the MR and the HA. Hence, the HA may choose a greater $T_{max-age}$ value the longer time that has elapsed since the timer was restarted, since the time measurement discrepancy due to synchronization inaccuracy grows with time.

If the HA determines that the advertisement information is recent enough, the local connectivity test towards the MR that originated the information is deemed successful. If the local connectivity tests towards all MRs that are currently using the concerned prefix(es) are successful, the HA accepts to assign the concerned prefix(es) to the MR (i.e. the MR that sent the BU to the HA) and returns a BA to the MR indicating the success.

If at least one local connectivity test fails (i.e. completeness could not be verified in step 530), the HA does not accept to assign the requested prefix(es) for which the test failed. The HA may either reject the Binding Update (indicating the failure in a BA) or choose to assign one or more alternative prefix(es) to the MR (indicated in a BA).

In order to be able to determine the age of received advertisement information, the HA must maintain a timer corresponding to each of the timers running in the MRs that are registered in the MR. At each Binding Update procedure (or alternatively at each prefix assignment) the HA must restart the appropriate timer, as must the concerned MR, so that the corresponding timers in HA and the MR are synchronized. "Timer" should here be interpreted in a general sense. It would e.g. suffice to record the current time when the "timer" is to be started/restarted and subtract this recorded value from the current time when the "timer" is read.

A variant of the timestamp method is to use sequence numbers instead, which, like the timers above, are restarted when the MR performs a Binding Update procedure or when a prefix is assigned. Together with a fixed sequence number increment period (i.e. the time period between two consecutive increments of the sequence number), $P_{inc}$, such a sequence number, S, is equivalent to a timestamp, T, because $T = S \times P_{inc}$. The fixed increment period, $P_{inc}$, may be preconfigured in the HA or included in the advertisement information, associated with S. The MR is then free to use any fixed or variable advertisement period, $T_{adv}$, that fulfils $T_{adv} \leq P_{inc}$. One may also choose to set $P_{inc} = T_{adv}$, consequently requiring a fixed advertisement period, $T_{adv}$. The fixed advertisement period would then have to be preconfigured in the HA or included in the advertisement information (instead of the increment period, $P_{inc}$). Thus, assuming a fixed increment period (either in the form of a fixed advertisement period or as a separate parameter) that is known to the HA the sequence numbers can replace the timestamps in the above description.

The timestamp/sequence number method is preferred embodiment over the alternative methods described below. Compared to sequence numbers the timestamps have the advantage that it allows the MR to have a flexible advertisement period (as long as it does not exceed some maximum value) and still have the timestamp convey accurate time information. In contrast, the sequence numbers allow flexible advertisement periods only if the fixed increment period is independent of the advertisement period (as long as the advertisement period does not exceed the increment period). But then the time resulting from multiplying the sequence number by the increment period, i.e. $S \times P_{inc}$, will not represent the time when the advertisement information was sent, but instead the time when the sequence number was last incremented before the advertisement information was sent. A simple format of a timestamp could be e.g. an integer representing the number seconds since the timer was restarted.

Using Hash Chains

A further alternative for the age indicator in the advertisement information is to use hash chains. A hash chain is based on a one-way hash function, h, which is computed iteratively over its own result, starting from an initial seed, s. That is:

$$h_1 = h(s),$$
$$h_2 = h(h_1) = h(h(s)),$$
$$h_3 = h(h_2) = h(h(h(s)))$$
$$\vdots$$
$$h_n = h_{n-1} = \underbrace{h(h(h \ldots h(s) \ldots))}_{n \text{ hash calculations}}$$

In the present example case the seed is $D_{ss}$, i.e. $s = D_{ss}$, or derived from $D_{ss}$, e.g. $s = f(D_{ss})$.

The hash chain is initialized in the MR when the MR performs a Binding Update or has a prefix assigned. Then the MR periodically recalculates the hash chain value (e.g. $h_{n+1} = h(h_n)$) and the latest hash chain value is what is included in the advertisement information. Examples of hash algorithms that could be used include e.g. MD5 or SHA-1.

In order to provide an age indication the hash chain method, like the signed sequence number method, requires a fixed period when the next "link" in the chain is calculated, i.e. when $h_n$ is recalculated to $h_{n+1}$. This fixed period is denoted "recalculation period", $P_{recalc}$. $P_{recalc}$ has to be known to the HA and may be either preconfigured in the HA or included in the advertisement information, associated with the hash chain value.

When the HA receives advertisement information containing a hash chain value, it knows the time that has elapsed since the hash chain was initialized (e.g. because the HA has recorded that time). Dividing the elapsed time by the recalculation period, $P_{recalc}$, indicates to the HA the expected value of the hash chain value index, e.g. k (i.e. the latest hash chain value is expected to be $h_k$). In order to verify the hash chain value the HA then calculates $h_k$ and compares it with the hash chain value in the received advertisement information. In order to account for imperfect synchronization between the HA and the MR the HA may also calculate $h_{k-1}$ and/or $h_{k+1}$, especially if the elapsed time indicates that the MR should be close to either the beginning or the end of a recalculation period. If the hash chain value in the received advertisement information matches $h_k$ (or possibly $h_{k-1}$ or $h_{k+1}$), this indicates two things to the HA:

1. The advertisement information originates from the claimed MR, i.e. from the MR whose identity is included in the advertisement information. This means that at the time the advertisement information was sent from its originator there was local connectivity between the sending and the receiving MR.
2. The advertisement information is reasonably recent, which means that a recent enough indication of local connectivity has been provided.

Thus the local connectivity test is successful. If none of the hash chain values that the HA can accept matches the hash chain value in the received advertisement information, the local connectivity test has failed.

In order to make it easier for the HA to find the matching hash chain value, the MR may include the hash chain value index in the advertisement information, associated with the hash chain value itself (i.e. if the hash chain value is $h_k$, then the index k would also be included in the advertisement information). This variant of the hash chain is quite similar to the signed sequence number method. The sequence number is there in both methods, but in the hash chain method the hash chain value, instead of the digital signature or MAC, authenticates the originating MR. It would even be possible to include a timestamp in the advertisement information to provide the age indication and let the hash chain value authenticate the originating MR (thus making it similar to the signed timestamp method).

Similar to the case with the increment period, $P_{inc}$, in the signed sequence number method, the fixed recalculation period, $P_{recalc}$, may be preconfigured in the HA or included in the advertisement information, associated with the hash chain value. The MR is then free to use any fixed or variable advertisement period, $T_{adv}$, that fulfils $T_{adv} \leq P_{recalc}$. One may also choose to set $P_{recalc} = T_{adv}$, consequently requiring a fixed advertisement period, $T_{adv}$. The fixed advertisement period would then have to be preconfigured in the HA or included in the advertisement information (instead of the recalculation period, $P_{recalc}$).

Using Irreversible Pseudo Random Number Sequences

Yet another alternative for the age indicator in the advertisement information is to use irreversible pseudo random number sequences. Such a pseudo random number sequence should have the properties that even if one knows one passed value, a few passed values or even all passed values in the sequence one should not be able to calculate the secret seed that the pseudo random number sequence was initialized with. Neither should this allow you to calculate any of the future values in the sequence. In the present example the initializing seed, s, is $D_{ss}$, i.e. $s = D_{ss}$, or derived from $D_{ss}$, e.g. $s = f(D_{ss})$.

The irreversible pseudo random number sequence method is equivalent to the hash chain method with the hash chain replaced by the pseudo random number sequence. Thus, the details described above are relevant also for the irreversible pseudo random number sequence method.

One difference from the hash chain method, though, may be that the resistance of the pseudo random number sequence against derivation of the seed or future values in the sequence may not be regarded as strong enough. In such case the advertisement information may be protected by a digital signature or a MAC, preferably computed over the entire advertisement information using $D_{ss}$ (or a key derived from $D_{ss}$) as the signing/integrity key.

There may be a risk that the HA and a MR originating advertisement information for some reason do not have the same perception of which was the last Binding Update (which should be used as the reference for the age indicator in the advertisement information). Possibly such a situation could arise e.g. if the MR never receives the BA, so that the HA believes that the Binding Update procedure was successful, but the MR thinks it was not.

The MR and the HA could still remain synchronized in terms of the reference for the age indicator if the HA transfers a sequence number to the MR in the BA (e.g. in a new mobility option), which sequence number would act as a reference to that particular Binding Update procedure. This sequence number would then be included in the advertisement information, associated with the age indicator, to provide an explicit indication of which Binding Update procedure the originating MR is using as reference for the age indicator.

Distribution of the Advertisement Information

The advertisement information is distributed to other MRs through periodic broadcast or multicast messages on the local link (i.e. confined to the moving network), in step 515. An attractive alternative is to integrate the advertisement information in the regular IPv6 router advertisements (see T. Narten et al., "Neighbor Discovery for IP Version 6 (IPv6)", RFC 2461, December 1998) which are anyway periodically broadcast by all MRs (and all other IPv6 routers) to announce their presence and their properties. The information could easily be included in a new option field. Backwards compatibility with MNNs is not a problem. According to RFC 2461 all nodes must silently ignore any options they do not recognize in a received IPv6 router advertisement.

Another alternative is to use a new dedicated message that is multicast to an all-MR multicast group. A reason for choosing this alternative could be if the regular router advertisement period is regarded as too long for the purpose of a local connectivity test.

A MR should not send or forward a message containing advertisement information beyond the local link that forms the moving network. The same rule as those set forth to the "link-local message" (step 315 of FIG. 3a) should apply also to the message distributing the advertisement information.

Instead of having preconfigured advertisement periods and/or advertisement information update periods or having the originating MR inform the HA through the advertisement information, the control can be given to the HA.

The HA would then include the advertisement period and/or advertisement information update period that it wants the MR to use in the BA. The HA could indicate to the MR that it should use:
- fixed periods with a certain length indicated by the HA,
- fixed periods chosen by the MR and included in the advertisement information,
- variable periods with an upper bound, or
- variable periods within minimum and maximum bounds.

As an alternative to the above described processes wherein the advertisement period is controlled by the MR that originates the advertisement information, a MR that is about to send a BU can be given a more active role. Instead of relying on the regular advertisement messages the MR that is about to send a BU sends a multicast message to the other MRs (addressed to a multicast group for all MRs or the existing multicast group for all routers), requesting them to immediately send an advertisement message. The MR may possibly repeat the multicast message for increased robustness. The MRs receiving the triggering multicast message may use a (short) random delay before sending the requested advertisement information in order to avoid collisions with advertisement messages from other MRs. A MR may omit the random delay if it knows/believes that there are no other MRs in the moving network than itself and the MR sending the triggering message.

With this variation a MR can always swiftly collect recent advertisement information from all the other MRs before sending a BU. It should however be noted that these mechanisms work only when the timestamp method is used.

If the above-described triggered advertisements mechanism is used, then the regular periodic advertisement are essentially not needed, although it is quite possible to use both periodic advertisements and triggered advertisements in combination. (If IPv6 router advertisements are used as the advertisement messages, then these combined mechanisms are already in place in the form of periodic (unsolicited) broadcast router advertisements and solicited router advertisements.) Eliminating the regular periodic advertisements and relying solely on triggered advertisements has the further advantage that it relieves the network from the load caused by the regular advertisement messages or, if IPv6 router advertisements are used as the advertisement messages, reduces the network load by reducing the size of the IPv6 router advertisements. In such case it would also be possible to use unicast triggered advertisement messages, which are sent only to the MR that sent the triggering message, instead of broadcast or multicast messages.

The age indicator in the advertisement information provides both recentness indication and replay protection. However, if triggered advertisements are used (as described above), then both these purposes can be served by a nonce generated by the MR sending the triggering message. A triggering MR would include the nonce in the triggering message and a triggered MR would include the received nonce in the advertisement information in the triggered advertisement message. This indicates to the triggering MR that the advertisement message was indeed triggered by the triggering MR and that it thus is recent. The nonce would be covered by the digital signature/MAC that authenticates the source and protects the integrity of the rest of the advertisement information. This proves to the HA that the claimed MR has actually generated the advertisement information. Leveraging the MR-HA security relation, the HA trusts the triggering MR to generate a unique nonce and to only provide advertisement information that the triggering MR knows (from the matching nonce) to be recent. Hence, the nonce provides recentness indication and replay protection also from the HA's perspective. When this variation is used it may be preferable to use unicast triggered advertisement messages, since the information in the message is anyway not useful for a MR that has not generated the nonce.

Forwarding the Advertisement Information to the HA (Step 525)

The purpose of the advertisement information is that a MR that wants to perform a Binding Update procedure and be assigned (or reassigned) a certain prefix should be able to provide the HA with advertisement information the MR has received from other MRs announcing the same prefix in order to prove local connectivity to these routers.

The preferable way to do this is to include the concerned advertisement information in the BU message, e.g. in a new mobility option, resulting in the described message sequence as illustrated in FIG. 5b.

Figure 5C:
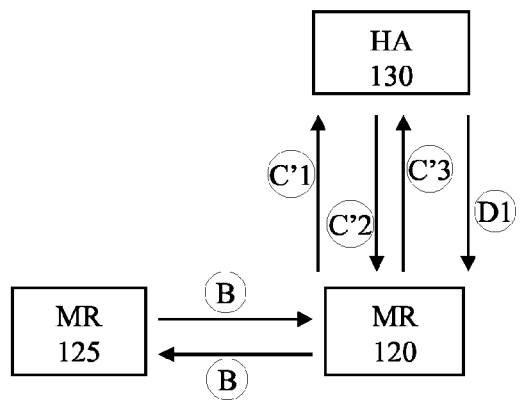

An alternative that keeps the present BU format unchanged, even with regards to the existing mobility options, is to use separate messages for a request-response transaction that would convey the advertisement information to the HA as illustrated in FIG. 5c. On reception of a BU (message C'1) the HA 130 would send an Advertisement Information Request message (message C'2) to the MR 120, which would respond with an Advertisement Information Response message (message C'3) containing the requested advertisement information, the MR specific information. This alternative has the disadvantages that it adds a roundtrip to the Binding Update procedure and that two completely new messages are introduced.

Additional Mechanism when all MRs Cannot Hear Each Other

Layer 1 and layer 2 media for IP based Local Area Networks comes in a variety of shapes and more are in the makings. Some of these media have, or may potentially have, the property that all nodes, in particular all MRs, in the layer 2 network cannot necessarily hear each other directly, e.g. because they are out of each other's radio range.

In such networks the broadcast embodiment of the present invention n, will need some adaptation due to that, the broadcast/multicast advertisement information will not always reach all MRs, even though they may belong to the same IP subnet. Therefore, additional mechanisms are needed to enable the embodiment to work also in moving networks with this property.

The additional mechanisms include a replication mechanism, which allows MRs to replicate and retransmit each other's advertisement information, so that all MRs' advertisement information will eventually reach all MRs in the moving network.

A MR can replicate advertisement information either by simply retransmitting (broadcasting or multicasting) any valid advertisement information message (whether this is a Router Advertisement or dedicated type of message) that it receives or by including in its own regular advertisement information messages the latest valid advertisement information that it has received from each other MR.

"Valid advertisement information message" means an advertisement information message that the MR has not replicated before.

"The latest valid advertisement information" refers to the latest received advertisement information concerning a certain originating MR that is not older than one advertisement period (according to a preconfigured advertisement period or as indicated in the received advertisement information) measured from when the MR received the information and that the MR has not replicated before. That is, if the MR received the latest advertisement information concerning a certain originating MR more than one advertisement period ago (referring to the advertisement period pertaining to the received advertisement information), this advertisement information should preferably not be replicated in the MR's own advertisement information message. Nor should the MR replicate advertisement information that it has already replicated, regardless of its age. How a MR can avoid replicating advertisement information that the MR has already replicated is described below.

In order to avoid loops of replicated advertisement information, each piece of advertisement information could be provided with an associated sequence number. Together with the MR identity in the advertisement information the sequence number makes the piece of advertisement information unique within a time period representing many advertisement periods (depending on the number of bits that are used for the sequence number). Through temporary caching of the unique identifier consisting of the combination of MR identity and sequence number, a MR should make sure not to replicate any piece of advertisement information that it has recently already replicated.

If the options and alternatives of the embodiment, as described above, are chosen such that there already is a sequence number in the advertisement information and this sequence number is updated by the originator in every advertisement information message, then no additional sequence number is needed for the purpose of replication loop avoidance.

Moreover, as long as the advertisement information in each advertisement information message from the same originator is unique (i.e. the advertisement information is updated with each advertisement information message), loop avoidance can be assured even without an additional sequence number. Instead a MR could temporarily cache an "advertisement information identifier" consisting of e.g. the age-indicating piece of data together with the MR identity in the advertisement information or the entire advertisement information or a digest of the advertisement information.

From the HA's perspective a consequence of replication through inclusion in the MR's own regular advertisement information messages is that it has to use greater margins in its calculations of recentness in order to account not only for synchronization inaccuracy, but also the delays caused by the replication mechanism. This effect is greater if the originating MR is using a smaller advertisement period (or advertisement information update period) than the advertisement period used by the replicating MR(s), increasing with increasing difference in the time periods and with the number of replications.

Therefore, if advertisement information is replicated through inclusion in the MR's own regular advertisement information messages, there should preferably be stricter rules for the advertisement periods (and for the advertisement information update periods) than was previously described. Unrestricted flexibility should preferably not be allowed, if the HA is going to be able to efficiently use these time periods in its calculations of the recentness of advertisement information. Fixed, preconfigured time periods is an alternative, but some flexibility may still be allowed, when allowed by the solution in general, however preferably within more restrictive bounds.

It is mentioned above that the prefix(es) that a piece of advertisement information pertains to may be included in the advertisement information. In a moving network where the MRs replicate advertisement information, including the relevant prefix(es) in the advertisement information may be more useful than in other types of moving networks. Including the relevant prefix(es) in the advertisement information is therefore preferable in a moving network where the MRs replicate advertisement information. The reason is that a MR that receives only replicated advertisement information from a certain originating MR, but no Router Advertisements from the same originating MR (or possibly receives the Router Advertisements but cannot associate it with the replicated advertisement information), then the MR will not be able to deduce which prefix(es) the advertisement information pertains to, unless this/these prefix(es) is/are included in the advertisement information.

The method according to the invention, as exemplified with the above embodiments, may be extended and varied, for example to adapt to different protocols. Examples of such extensions and variations, representing different embodiments of the invention will be given below.

Solution with the Current NEMO Basic Support Protocol

The above embodiments can readily be adapted to work with the current (unmodified) NEMO basic support protocol. The following adaptations are necessary:

1. The prefixes must be statically assigned, since the NEMO basic support protocol does not support dynamic prefix assignment. A statically assigned prefix must be configured in the MR and may or may not be configured in the HA. If the prefix is not configured in the HA the MR has to include it in the Mobile Network Prefix Option in the BU.

2. In the triggered local connectivity test embodiment the address to be used for local connectivity tests must be configured in the HA, or implicitly made known to the HA, for each MR. With the configuration method the relevant interface identifier of the MR needs to be configured in the HA. If a link-local address is used (which is preferable), the HA simply adds the link-local prefix to the configured interface identifier (i.e. the interface identifier is appended to the link-local prefix) in order to form a complete local connectivity test address. If a non-link-local address is used, the HA appends the interface identifier to the prefix, when the prefix has been assigned to the MR.

Instead of separately configuring the interface identifier of the local connectivity test address of a MR in the HA, it implicitly can be made known to the HA by mandating that the MR use the same interface identifier for its local connectivity test address as for its home address.

3. The nonce or $D_{ss}$ should not be transferred from the HA to the MR in the BA, since this requires the addition of a (backwards compatible) mobility option in the BA. In order to avoid transferring the nonce/$D_{ss}$ to the MR in the BA, it has to be possible to derive the nonce/$D_{ss}$ locally in the MR and the HA. This can be achieved by basing the nonce/$D_{ss}$ derivation on a pre-shared secret. Assuming that such a pre-shared secret already exists as the basis of the security relation between the MR and the HA, no additional configuration is needed. The pre-shared secret (or a key derived from the pre-shared secret) can then be used to encrypt e.g. the entire BU or BA (or both concatenated) to arrive at a nonce/$D_{ss}$ that is mutually known by the MR and the HA. Other alternatives include forming the nonce from a hash operation on e.g. BU|pre-shared secret|BA (where "|" indicates concatenation).

It would also be possible to configure the nonce/$D_{ss}$ in the MR and the HA. In the triggered local connectivity test embodiment an alternative way to avoid transferring the nonce (i.e. nonce$_{MR1}$) in the BA can be used if the MR and the HA already has configured means to perform challenge-response based authentications of the MR (and otherwise such means can be arranged). Then the nonce stored in the MR (i.e. nonce$_{MR1}$) can be omitted completely. Instead nonce$_{c\text{-}test}$ would be used as a challenge and the MR would provide a response according to the challenge-response authentication algorithm in the response to the local connectivity test message.

4. In the embodiment referred to as broadcast local connectivity test, the advertisement information cannot be conveyed to the HA in the BU. Instead dedicated messages have to be used to request (HA→MR) and return (HA←MR) the advertisement information, as described with reference to FIG. 5c.

With the above modifications of the basic solution the BU/BA messages can be used as currently specified in the NEMO basic support protocol without modifications. In the triggered local connectivity test embodiment the message by which the HA requests a MR to perform a local connectivity test towards another MR (message C2 in FIG. 4b) and the message in which the MR returns the result from the local connectivity test (message C3 in FIG. 4b) are however completely new messages, as well as the local connectivity test message (message B1 in FIG. 4b) and its corresponding response message (message B2 in FIG. 4b) that are used between the MRs. Similarly, in the broadcast local connectivity test embodiment the message that the HA uses to request advertisement information (message C'2 in FIG. 5c) and its corresponding response message (message C'3 in FIG. 5c) are completely new messages.

Hybrid variants of the triggered local connectivity test embodiment with statically assigned prefixes, but dynamically generated local connectivity test addresses, or configured local connectivity test addresses, but dynamically assigned prefixes are of course also conceivable.

Alternative Prefix(es) in Prefix Assignment Request

When a MR requests its HA to have a certain prefix assigned, e.g. using a BU or a new type of message, it may provide one or more alternative prefix(es) to the preferred one. If the HA cannot accept to assign the preferred prefix to the MR, it would preferably assign one of the indicated alternative prefixes instead.

The alternative prefixes may be provided in the form of a list of prefixes in order of preference. It would also be possible to let the MR simply supply a number of prefixes without internal order of preference (not even a single preferred one) and leave the choice entirely to the HA.

Flexibility for More Future Proof Local Connectivity Test

To make the mechanisms of the local connectivity test more future proof some flexibility could be designed into it from the start.

One such flexibility measure is the ability to use different algorithms for the digital signatures, irreversible operations, MACs, hash operations and/or pseudo random number sequences in the solution.

The HA could indicate in the BA, i.e. in step 305 in FIG. 3a, when the MR is prepared for future local connectivity tests, which algorithm(s) that should be used for the relevant functions, if other than default algorithms. In the triggered local connectivity test embodiment an alternative is that an algorithm indication for the irreversible operation is included in the message that the HA uses to request the local connectivity test (message C2 in FIG. 4b) and then forwarded in the local connectivity test message (message B1 in FIG. 4b) to the MR that is to perform the irreversible operation. In addition the HA could indicate the length that should be used for nonces, keys, signatures and/or MACs that are used in the solution.

Alternatively, the MR suggests algorithms, and possibly nonce/key/signature/MAC sizes, in the BU (in step 305 in FIG. 3a) and the HA acknowledges these suggestions, selects a subset of them, or dictates alternative choices in the BA.

An example of increasing the flexibility in the triggered local connectivity test embodiment is the ability to use different algorithms for the irreversible operation performed on the two nonces involved in the local connectivity test. With the notation used above, the HA could associate with nonce$_{MR1}$ an indication of what algorithm to be used when performing the irreversible operation on nonce$_{MR1}$ and nonce$_{c\text{-}test}$. Alternatively, this algorithm indication could equally well be associated with nonce$_{c\text{-}test}$.

Multiple Prefixes Per MR

Although the basic solution in the triggered local connectivity test embodiment has been described in terms of one prefix per MR, it is easily extended to work with multiple prefixes per MR. The mechanisms for both dynamic and static prefix assignment would then be modified to handle lists of prefixes instead of single prefixes.

If the MR uses a unique local connectivity test address for each prefix (i.e. non-link-local addresses), the MR may transfer a full local connectivity test address for each prefix to the HA or a single interface identifier which is appended to the respective prefixes to form the complete local connectivity test addresses. If the MR uses multiple interfaces in the moving network, it may also transfer one interface identifier for each prefix (and then some prefixes may share interface identifier, whereas other prefixes do not).

The HA would assess the need for a local connectivity test for each prefix separately and the local connectivity tests would be executed accordingly. However, irrespective of the number of prefixes involved, a MR would only have to perform the local connectivity test once towards another particular MR. That is, if a MR confirms local connectivity towards another MR, this confirmation is valid for all the prefixes that the two MRs may share. An exception to this is when the above described extensions for multi-homed MRs are used in the triggered local connectivity test embodiment.

Filter Local Connectivity Test Messages in the HA

As an additional precaution with the purpose of reducing the risk that a local connectivity test message is conveyed beyond the local link the HA could monitor the traffic arriving through MR tunnels or about to enter an MR tunnel and filter and discard local connectivity test messages (message B1 in FIG. 4b) and their response messages (message B2 in FIG. 4b).

If these messages are transferred on top of a transport protocol, e.g. UDP or TCP, the HA can identify them by looking for the particular port number(s) that they use.

The messages could also be transferred as new message types in the MIPv6 (and NEMO) mobility header (which is an IPv6 extension header), i.e. using new mobility header type values. The HA would then look for these mobility header type values.

Another possibility would be to transfer the messages as IPv6 extension headers, in which case the HA would look for the particular next header field value(s) indicating these extension headers.

Yet a possibility would be to convey the messages in IPv6 options (which the HA can detect).

Using the Solution in an IPv4 Environment

The basic solution was described in conjunction with the NEMO basic support protocol, which is defined only for IPv6. However, the principles and mechanisms of the NEMO basic support protocol, as well as the basic solution of this invention, can be generalized to work also in an IPv4 environment. For the NEMO basic support protocol this means that the protocol should be specified in terms of extensions to Mobile IPv4 (MIPv4) as described in C. Perkins et al., "IP Mobility Support for IPv4", RFC 3344, August 2002, instead of extensions to MIPv6. Alternatively, the mechanisms that are currently being worked on in the IETF to allow MIPv4 to run across IPv4 networks may be utilized or generalized to allow the current IPv6 based NEMO Basic Support protocol to run across IPv4 networks.

For the basic solution of this invention generalization to IPv4 implies certain minor modifications. All addresses and prefixes that are involved have to be IPv4 addresses and prefixes instead of IPv6. This includes e.g. the MR home address, in case the home address is used as the MR identity in the advertisement information, prefixes that are assigned, configured and/or included in the advertisement information.

One example of a required modification is when a MR provides the HA with a non-link-local IPv4 local connectivity test address, the prefix, and thus the length of the prefix, of the address is not yet known. To handle this situation the following procedure may be used.

The MR supplies a string of 32 bits, from which the last part of the address will be taken. As soon as the prefix has been assigned, the prefix replaces a corresponding number of bits at the beginning of the bit string, in order to form the complete IPv4 local connectivity test address. Both the HA and the MR performs this operation. If the MR has a statically assigned prefix, this procedure is not needed, since both the prefix and the length of the prefix are known beforehand. Thus, the MR can transfer either the complete IPv4 local connectivity test address or its non-prefix part to the HA, unless the IPv4 local connectivity test address is configured in the HA.

If dynamic prefix assignment is used, but the IPv4 local connectivity test address is still to be configured in the HA, then the HA is configured with a string of 32 bits, of which some initial bits are replaced by a later assigned prefix, as described above.

Another possible adaptation to the IPv4 environment is that when requesting a prefix to be assigned, a MR may supply the preferred length (or lengths) of the alternative prefix that the HA may assign, in case the local connectivity test fails (or the HA for some other reason does not accept to assign the preferred prefix to a MR).

The IPv4 environment may also affect the choice of distribution mechanism for the advertisement information. If router advertisement messages are used to distribute advertisement information, IPv4 router advertisements may simply replace the IPv6 router advertisements. However, the IPv4 router advertisement message does not have the inherent extensibility that the IPv6 router advertisement message has. Hence, integrating the advertisement information in the router advertisement is a much less attractive alternative in the IPv4 case (thus pointing in favor of dedicated multicast messages).

In the IPv4 case the rules concerning the hop limit field in the IPv6 header that are used to confine the distribution messages to the local link instead apply to the TTL field in the IPv4 header.

If one of the defined IPv4-to-IPv6 migration mechanisms or one of the available approaches for running MIPv6 over IPv4 networks is used for the MR-HA tunnel, then the NEMO Basic Support protocol as such does not have to be adapted to the IPv4 environment. Only the assigned prefix(es) and the addresses that are used internally in the IPv4 based moving network have to be changed to IPv4 prefix(es) and addresses.

Adapting the Solution to the Routing Protocol Option of the NEMO Basic Support Protocol In certain cases support of the routing protocol option requires that the inventive method is adapted.

If the prefix is dynamically assigned, the local connectivity test can be used as previously described and there is no impact from the routing protocol option.

If the prefix is preconfigured in the MR, then a simple solution is to mandate that the prefix is configured (and associated with the concerned MR) in the HA too (such configuration is an available option anyway). Then the local connectivity test can be used as previously described.

Another equally simple solution is to mandate that the MR include its prefix(es) in the Mobile Network Prefix Option in the BU. Also with this solution the local connectivity test can be used in the same way as previously described.

However, if both these solutions for some reason are avoided, then the HA does not know which prefix a MR will be using when a BU is received from the MR. This causes a problem, because the HA does not know which the other MRs are that may be sharing the same prefix as the concerned MR and to which MRs local connectivity should be proven.

A way to handle the situation in the broadcast local connectivity test embodiment is that the MR supplies the advertisement information that it has received from other MRs using the same prefix or, more preferably, from all other MRs in the moving network, as described in the basic solution. The HA accepts the BU without checking the advertisement information, since it yet does not know what to require from the received advertisement information.

Then, when the MR-HA tunnel is established, the MR and the HA start using the routing protocol through the tunnel. At that point the HA becomes aware of the prefix that the MR is using.

When the HA is aware of the prefix of the MR, it can examine the advertisement information supplied by the concerned MR and check whether it indicates local connectivity to the required MR(s) (i.e. whether completeness can be verified). If the HA finds that this is the case, nothing more needs to be done.

In the triggered local connectivity test embodiment the HA can, after becoming aware of the prefix(es) of the MR, initiate a local connectivity test as previously described. If local connectivity to the required MR(s) can be verified (i.e. if completeness is verified), then nothing more needs to be done.

However, if the local connectivity test fails, i.e. if completeness cannot be verified, the HA should take actions to resolve the situation. This applies to both the triggered local connectivity test embodiment and the broadcast local connectivity test embodiment.

The HA then has several alternative options for how to deal with the situation:

Send a message to the MR that it is not allowed to use the prefix and in addition possibly remove the MR's binding in the HA. For this purpose the HA may use a new message or an unsolicited BA with an error indication. Since the prefix is preconfigured in the MR, the HA cannot assign an alternative prefix to the MR. If the MR has a preconfigured alternative prefix, it can attempt to use that instead. If the MR's binding is deleted, the MR has to restart the Binding Update procedure and then use the alternative prefix in the routing protocol. If the MR's binding is still valid, the MR may simply switch to the alternative prefix in the routing protocol. When the HA identifies the new (alternative) prefix through the routing protocol, it initiates if needed the local connectivity test again (in the triggered local connectivity test embodiment). Alternatively, in the broadcast local connectivity test embodiment, the HA checks the previously supplied advertisement information again to check whether the local connectivity that is required for the new prefix exists, provided that the MR has supplied the advertisement information it has received from all other MRs in the moving network. If the MR only supplied advertisement information received from the MRs using the first prefix, then the HA has to use a dedicated message, e.g. of the same message type as message C'2 in FIG. 5c, to request the required advertisement information from the MR. The MR then supplies the requested advertisement information in another dedicated message, e.g. of the same message type as message C'3 in FIG. 5c, so that the HA can use the advertisement information to check the local connectivity status.

Silently delete the MR's binding in the HA.

The failed local connectivity test implies that the MR now may have multiple entries in its routing table for the same prefix. To be able to correctly route downlink traffic (i.e. packets in the direction towards the moving networks) in this situation the HA relies on information retrieved from the uplink traffic. The HA learns the addresses of the MNNs in the respective moving network by looking at the source address of uplink packets (i.e. packets arriving in the direction from the moving network). For each learnt MNN address the HA sets up a host route in its routing table (i.e. a separate routing table entry for each particular MNN address), pointing towards the tunnel associated with the moving network of the MNN. If not refreshed by uplink packets from the MNN, the routing table entry for a MNN should time out and be deleted after a while. If a downlink packet arrives that is destined for a MNN whose address is not included in the routing table of the HA, the HA should preferably forward this packet through all the relevant MR-HA tunnels (i.e. the tunnels of the MRs sharing the same prefix, or at least one MR-HA tunnel for each separate moving network to which MRs sharing the same prefix are connected). Alternatively, the HA may choose to forward a downlink packet, for which the destination address is not found in the routing table, through only one of the MR-HA tunnels associated with the concerned prefix. It would then choose a tunnel that it has given a higher priority (which preferably should not be the newest one for which the local connectivity test failed).

If, in the broadcast local connectivity test embodiment, the (less preferable) dedicated messages described in conjunction with FIG. 5c (i.e. messages C'2 and C'3 in FIG. 5c) are used instead of the BU to convey the advertisement information to the HA, then the HA will accept a regular BU/BA exchange and then, after getting to know the prefix the MR is using via the routing protocol, request the advertisement information from the MR.

Alternative Long-Lived Nonce Assignment/Generation

It is preferable that the HA controls and coordinates the involved procedures to the extent possible. Therefore it is natural that the HA generates the (relatively) long-lived nonce in the triggered local connectivity test embodiment (i.e. nonce$_{MR1}$ in the example above) and assigns it to the MRs for future local connectivity tests. This is, however, not the only way to generate and assign the nonce.

An alternative variant is to let the MR generate the long-lived nonce and send it to the HA in the BU. It is also possible to let the MR and the HA each supply a part of the nonce or parts of the input to a common nonce generation process. Any data supplied by the MR would be transferred to the HA in the BU and any data supplied by the HA would be transferred to the MR in the BA. The requirement is that the MR and the HA after the BU/BA exchange share a common secret piece of data to be used as the (relatively) long-lived nonce (i.e. nonce$_{MR1}$ in the example) in future local connectivity tests.

Leveraging the MR-HA Authentication Mechanism in the Local Connectivity Test

A rather radical variation of the triggered local connectivity test embodiment would be to replace the previously described test mechanism with a generic authentication relay mechanism, leveraging the existing MR-HA authentication mechanism (i.e. the authentication mechanism that is used in conjunction with the MR-HA security relation). That is, the HA would authenticate MR1 via MR2 (MR1 and MR2 being the MRs previously used to exemplify the triggered local connectivity test embodiment), using a generic authentication relay mechanism in MR2.

Although this may seem like a convenient solution, it has a number of drawbacks:

The local connectivity test becomes dependent on the existing authentication mechanism. This mechanism may come in a variety of forms, which makes this dependency unfavourable.

The authentication mechanism may include a single or multiple roundtrips. Multiple roundtrips add delay to the local connectivity test.

The authentication mechanism may include communication with a AAA server, adding delay to the local connectivity test.

The authentication mechanism may even be non-existent, if the MR and the HA have manually configured security associations.

If the local connectivity test is to be performed towards multiple MRs, aggregation of test request/response messages between the HA and MR performing the test (i.e. MR2 in the example above) may not be possible. Instead a complete exchange of messages may have to be performed for each involved MR.

Stand-Alone Local Connectivity Tests

The basic way to apply the local connectivity test is, as previously described, in combination with a Binding Update procedure in order to ensure that a prefix is not assigned to a MR that is not connected to the same moving network as the other (possible) MRs that have already been assigned the prefix.

It is however conceivable to apply the local connectivity test independently of the Binding Update procedure, i.e. as a stand-alone mechanism. One such application could be to allow the HA to monitor the connectivity status among the MRs that share a prefix assigned by the HA.

The HA could then at any time request a MR to perform a local connectivity test towards the other MRs sharing the same prefix (and if desired to any other MR too).

In the triggered local connectivity test embodiment the messages and mechanisms used in this process would be the same as previously described when the local connectivity test is applied in conjunction with a Binding Update procedure. That is, a stand-alone local connectivity test would consist of messages C2, B1, B2, C3 in FIG. 4b and the parameters nonce$_{MR1}$ (i.e. the long-lived nonce), nonce$_{c\text{-}test}$ (i.e. the one-time nonce) and the local connectivity test address would be used as before. The initial preparation, or "bootstrapping", for the test, i.e. when the HA and a MR exchange long-lived nonce and local connectivity test address (messages A1 and A2 in FIG. 4b) is however still assumed to be done in conjunction with a Binding Update procedure (unless dedicated messages are used for this exchange or unless the long-lived nonce and the local connectivity test address can be derived without an explicit data exchange as previously described).

To have a stand-alone local connectivity test performed in the broadcast local connectivity test embodiment the HA requests the desired advertisement information (e.g. advertisement information originating from all the MRs in a moving network or only from MRs supporting a certain prefix or even from one or more specific MR(s)) from a MR, using a dedicated Advertisement Information Request message, e.g. message C'2 in FIG. 5c. The MR then returns to the HA the most recently received advertisement information from each of the concerned MRs in a dedicated Advertisement Information Response message, e.g. message C'3 in FIG. 5c.

Figure 6A:
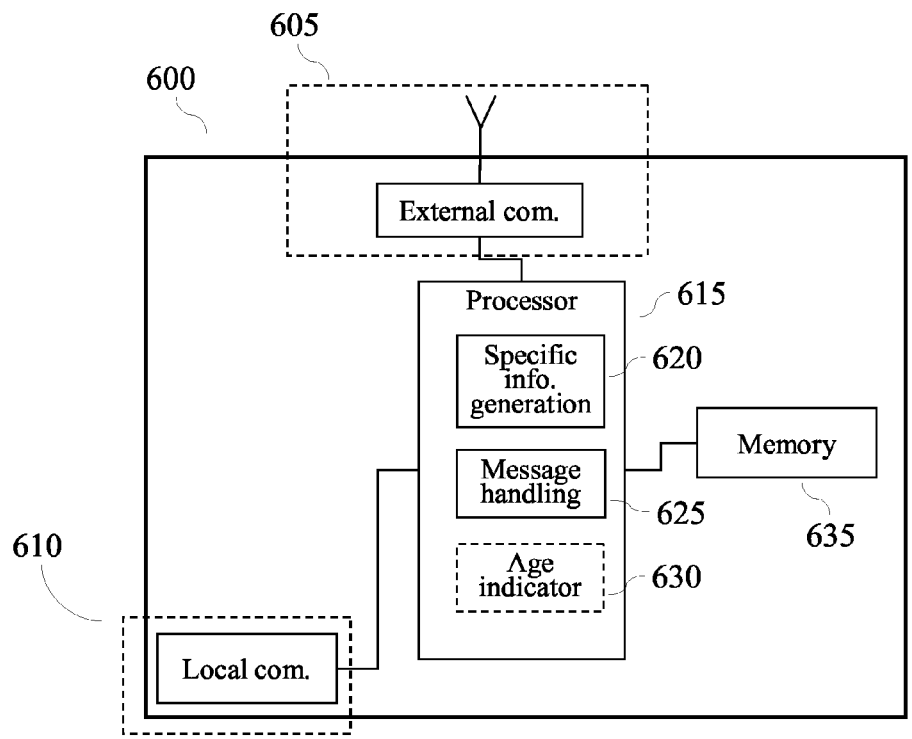
FIG. 6a illustrates a mobile router according to the invention, and 6b a home agent according to the invention.
Figure 6B:
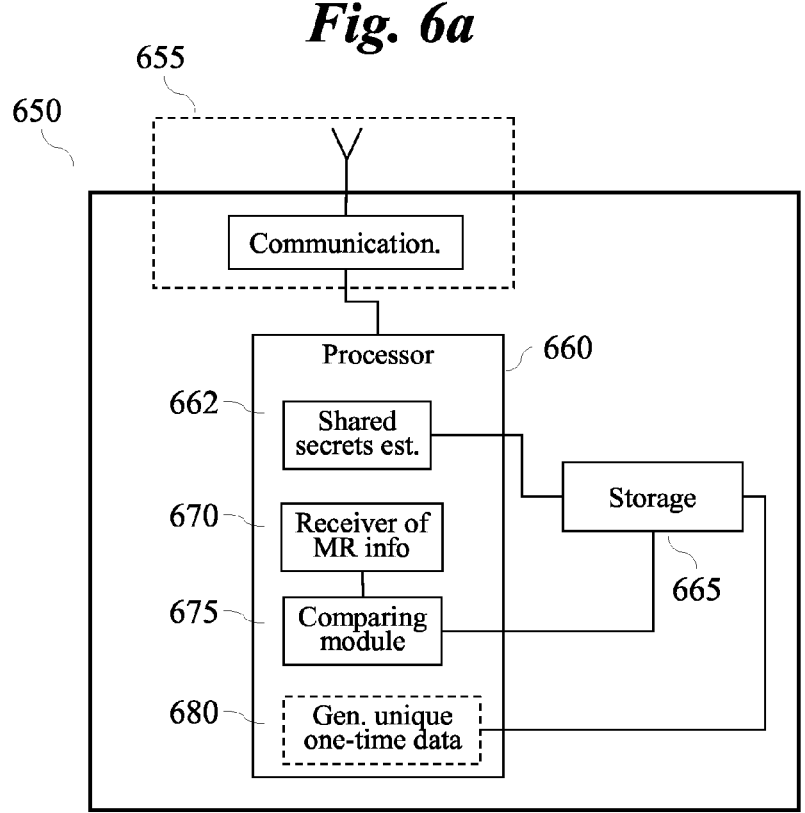

Arrangements according to the present invention in a mobile router and a home agent, suitable for effectuating the above described embodiments is schematically illustrated in FIG. 6a and FIG. 6b, respectively. The modules and blocks according to the present invention are to be regarded as functional parts of the MR and not necessarily as physical objects by themselves. The modules and blocks are preferably at least partly implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiving or sending device.

The MR 600 comprises external communication means 605, for example radio communication means, which provides the necessary functionalities for communication with WLAN, GPRS or WCDMA, for example. The external communication means 605 are adapted to the communication technique in question, which may be wireless or wireline, and is well known by the skilled person. The MR 600 is further provided with local communication means 610 adapted to provide the communication with the other nodes of the moving network. This communication can be wireline, for example Ethernet, or wireless for example WLAN or Bluetooth™. According to the invention the MR 600 comprises a processor 615, in connection with the external communication means 605 and the local communication means 610, and a memory module 635. The processor 615 is adapted to, via the external communication means 605, receive a shared secret from a HA, and to store the shared secret in the memory module 635. Alternatively, the processor 615 is adapted to generate a, or use a preconfigured, shared secret, mutually with, and in communication with, the HA. The processor 615 comprises a module 620 adapted for generating MR specific information based on the shared secret retrieved from the memory module 635, and a message handling module 625 adapted for including the MR specific information in link-local messages. The link-local messages are distributed in the moving network via the local communication means 610.

In one embodiment of the invention the processor 615 is provided with an age indicator 630, which provides the link-local message or the MR specific information with a timestamp, sequence number, or hash chain value in order to make it possible for a HA to determine the recentness of the MR specific information.

The home agent, HA, 650 comprises communication means 655 for communication with a plurality of MRs, for example radio communication means, which provides the necessary functionalities for communication with WLAN, GPRS or WCDMA, and processing means 660. The HA 600 is further provided with a module for establishing shared secrets 662 with at least a first mobile router, a storage module 665 to store the shared secret(s) of respective mobile routers, and a module for receiving MR specific information 670 in connection with the communication means 655 and adapted for receiving MR specific information, relating to a first MR, but received from a second MR. A comparing module 675 is in connection with the storage module 665 and the MR specific information receiving module 670 and comprises means for comparing received MR specific information associated with a first mobile router with data generated using the stored shared secret retrieved from the storage module 665. The home agent may further be provided with means for extracting age information from MR specific information and to check if the age of MR specific information is within a predetermined time limit.

According to one embodiment of the invention the HA 650 is provided with a module that generates unique one-time data 680. The comparing module 675 may in this embodiment be adapted to perform an irreversible operation on a stored shared secret and the unique one-time data retrieved from the storage module 665 and to compare the result with data from received MR specific information.

The method according to the present invention may be implemented, at least in parts, by means of program products or program module products comprising the software code means for performing the steps of the method. The program products are preferably executed on a plurality of entities within a network. The program is distributed and loaded from a computer usable medium, such as a USB-memory, a CD, or transmitted over the air, or downloaded from Internet, for example.

While the invention has been described in connection with what is presently considered to be the most practical and preferred embodiments, it is to be understood that the invention is not to be limited to the disclosed embodiments, on the contrary, it is intended to cover various modifications and equivalent arrangements within the appended claims.

The invention claimed is:

1. A method of performing a local connectivity test between a first mobile router and a second mobile router assigned to a home agent, wherein the first mobile router belongs to a moving network and is assigned a first prefix, the method comprising the steps of:
   establishing a shared secret between the first mobile router in the moving network and the home agent;
   the home agent providing the second mobile router with unique one-time data;
   the second mobile router
      sending the unique one-time data to the first mobile router in a link-local message, and
      sending a prefix request to the home agent,
   the first mobile router deriving information specific to the first mobile router, wherein the MR specific information is provided with a calculated result based at least partly on the shared secret and the unique one-time data,
   the first mobile router sharing the MR specific information with the second mobile router in a message confined to the moving network;
   the second mobile router forwarding said MR specific information to the home agent; and
   the home agent determining if an age of the MR specific information is within a predetermined time limit, and
      if the received MR specific information originates from the first mobile router by comparing the received MR specific information with previously stored information associated with the unique one-time data and the shared secret between the first mobile router and the home agent, or with data generated using previously stored information associated with the unique one-time data and the shared secret between the first mobile router and the home agent, the home agent allowing the second mobile router to be assigned the first prefix only if local connectivity between the first and second mobile router is indicated and the age of the MR specific information is within the pre-determined time limit.

2. The method according to claim 1, wherein a plurality of mobile routers belong to the same moving network and a first subset of the plurality of mobile routers are assigned the same first prefix; and
  in the establishing step unique shared secrets are established between the home agent and each of the plurality of mobile routers;
  in the deriving step each of the first subset of mobile routers derives respective MR specific information;
  in the sharing step the mobile routers in the first subset of mobile routers share their respective MR specific information with the second mobile router;
  in the forwarding step the second mobile router forwards MR specific information from at least the first subset of mobile routers; and
  in the comparing step the home agent allows the second mobile router to be assigned the first prefix only if local connectivity is verified between the second mobile router and all mobile routers of the first subset of mobile routers, and an age of all MR specific information is within a pre-determined time limit.

3. The method according to claim 1, wherein the second mobile router's request for a prefix is comprised in a binding update (BU) to the home agent.

4. The method according to claim 1, further comprising determining if the prefix requested by the second mobile router is identical with the first prefix, and the steps of forwarding, comparing and allowing are taken only if the requested prefix is identical with the first prefix.

5. The method according to claim 1, wherein the MR specific information comprises an age indicator, from which the home agent can determine the age of the MR specific information.

6. The method according to claim 1, wherein the step of establishing the shared secret further comprises the substeps of:
  the first mobile router providing the home agent with an address associated with the first mobile router;
  the home agent storing the shared secret and the address associated with the first mobile router; and
  providing the second mobile router with a unique one-time data further comprising providing the second mobile router with the address associated with the first mobile router.

7. The method according to claim 1, wherein the step of deriving the MR specific information comprises
  the first mobile router performing an irreversible operation on at least the shared secret and the unique one-time data; and
  the step of comparing comprises the home agent performing a corresponding irreversible operation on at least the stored shared secret and the unique one-time data and comparing the result of the corresponding irreversible operation with the received MR specific information.

8. The method according to claim 1, wherein the unique one-time data is generated by the home agent for each occasion of local connectivity test and an age of the MR specific information refers to the time period between the generation of the unique one-time data or the providing of the unique one-time data to the second mobile router and the HA receiving the MR specific information associated with the unique one-time data.

9. A mobile router adapted for providing gateway services in a moving network, the mobile router comprising;
  external communication means adapted for providing communication with a home agent,
  local communication means adapted to provide communication with other mobile routers in the moving network:
  a processor in connection with the external communication means and the local communication means and a memory module, the processor adapted to;
    via the external communication means, establish a shared secret with a home agent, and to store the shared secret in a memory module;
    receive a unique one-time data, via the local communication means;
    generate MR specific information by performing an irreversible operation on at least the shared secret and the unique one-time data, wherein the irreversible operation corresponds to an irreversible operation residing in the home agent, and the processor is adapted to receive an irreversible operation procedure from a home agent via the external communication means; and
    receive and store, or has been pre-configured with, a set of different irreversible operations and the mobile router is adapted to receive, from a home agent, instructions on which irreversible operation, from the set of different irreversible operations, to use in a generation of MR specific data;
  a module adapted for generating MR specific information based at least on the shared secret retrieved from the memory module and the unique one-time data; and
  a message handling module adapted for including the MR specific information in link-local messages confined to the moving network, and distributing said messages via the local communication means.

10. The mobile router according to claim 9, further comprising an age indicator module, adapted to provide the MR specific information with an age indicator.

11. The mobile router according to claim 10, wherein the age indicator module is adapted to provide a time-stamp, sequence number, or hash chain value to the MR specific information.

12. The mobile router according to claim 9, wherein the processor is further adapted to generate MR specific information by performing an irreversible operation on at least the shared secret and the unique one-time data.

13. The mobile router according to claim 9, wherein the processor is further adapted to receive MR specific information from the at least one other mobile router via the local communication means and to forward the MR specific information to a home agent via the external communication means.

14. The mobile router according to claim 13, wherein the processor is further adapted to receive a unique one-time data and addressing information via the external communication means and to forward the unique one-time data to a mobile router specified in the addressing information via the local communication means.

15. The mobile router according to claim 9, wherein the message handling module is adapted to include MR specific information in broadcasted or multicast messages.

16. A home agent for administering prefixes for a plurality of mobile routers in a moving network, the home agent comprising communication means for providing communication with the plurality of mobile routers, the home agent comprising:

a processor associated with a persistent memory storing instructions for:
        establishing shared secrets with at least one first mobile router and to store the shared secret of respective mobile routers;
        generating a unique one-time data and sending the unique one-time data to a second mobile router via the communication means;
    means for receiving MR specific information from the second mobile router via the communication means, the MR specific information, relating to the at least one first mobile router, having been shared between the at least one first mobile router and the second mobile router in a link-local message confined to the moving network;
    a comparing module for performing an irreversible operation on a stored shared secret of the at least one first mobile router and the unique one-time data and comparing the result with received MR specific information relating to the at least one first mobile router;
the home agent determining if an age of the MR specific information is within a predetermined time limit, and
    if the received MR specific information originates from the first mobile router by comparing the received MR specific information with previously stored information associated with the unique one-time data and the shared secret between the first mobile router and the home agent, or with data generated using previously stored information associated with the unique one-time data and the shared secret between the first mobile router and the home agent, the home agent allowing the second mobile router to be assigned a first prefix only if local connectivity between the first and second mobile router is indicated and the age of the MR specific information is within the pre-determined time limit.

\* \* \* \* \*

UNITED STATES PATENT AND TRADEMARK OFFICE
CERTIFICATE OF CORRECTION

| | | |
|---|---|---|
| PATENT NO. | : 8,155,029 B2 | Page 1 of 1 |
| APPLICATION NO. | : 12/305757 | |
| DATED | : April 10, 2012 | |
| INVENTOR(S) | : Rune | |

It is certified that error appears in the above-identified patent and that said Letters Patent is hereby corrected as shown below:

On the Face Page, in Field (75), under "Inventors", in Column 1, Line 1, delete "Lidingo" and insert -- Lidingö --, therefor.

In Fig. 6b, Sheet 8 of 8, for Tag "670", in Line 2, delete "info" and insert -- info. --, therefor.

In Column 1, Line 46, delete "form" and insert -- from --, therefor.

In Column 1, Line 60, delete "refereed" and insert -- referred --, therefor.

In Column 5, Line 51, delete "((i.e." and insert -- (i.e. --, therefor.

In Column 8, Line 19, delete "a via" and insert -- α via --, therefor.

In Column 8, Line 20, delete "13 via" and insert -- β via --, therefor.

In Column 16, Line 24, delete "MR2" and insert -- MRs --, therefor.

In Column 39, Line 54, in Claim 7, delete "comprises" and insert -- comprises: --, therefor.

In Column 40, Line 5, in Claim 9, delete "comprising;" and insert -- comprising: --, therefor.

Signed and Sealed this
Thirty-first Day of July, 2012

David J. Kappos
*Director of the United States Patent and Trademark Office*